United States Patent
Weidele et al.

(10) Patent No.: US 11,556,816 B2
(45) Date of Patent: Jan. 17, 2023

(54) CONDITIONAL PARALLEL COORDINATES IN AUTOMATED ARTIFICIAL INTELLIGENCE WITH CONSTRAINTS

(71) Applicant: International Business Machines Corporation, Armonk, NY (US)

(72) Inventors: Daniel Karl I. Weidele, Cambridge, MA (US); Parikshit Ram, Atlanta, GA (US); Dakuo Wang, Cambridge, MA (US); Abel Nicolas Valente, La Plata (AR); Arunima Chaudhary, Quincy, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 410 days.

(21) Appl. No.: 16/832,528

(22) Filed: Mar. 27, 2020

(65) Prior Publication Data
US 2021/0304028 A1 Sep. 30, 2021

(51) Int. Cl.
*H04L 9/40* (2022.01)
*G06N 5/04* (2006.01)
*G06N 20/00* (2019.01)

(52) U.S. Cl.
CPC ............ *G06N 5/04* (2013.01); *G06N 20/00* (2019.01)

(58) Field of Classification Search
CPC .......... G06N 5/04; G06N 20/00; G06N 5/003
See application file for complete search history.

(56) References Cited

U.S. PATENT DOCUMENTS

| | | | | |
|---|---|---|---|---|
| 4,823,272 A | * | 4/1989 | Inselberg | G01S 13/91 701/120 |
| 5,546,516 A | * | 8/1996 | Austel | G06F 16/283 345/418 |
| 5,917,500 A | * | 6/1999 | Johnson | G06T 11/206 345/440 |
| 10,721,708 B1 | * | 7/2020 | Mukherji | H04W 4/02 |
| 2018/0348998 A1 | * | 12/2018 | Mueller | G06K 9/6221 |
| 2019/0034825 A1 | * | 1/2019 | Tok | G06N 7/005 |

(Continued)

OTHER PUBLICATIONS

Weidele, "Conditional Parallel Coordinates," arXiv:1906.07716v2 [cs.HC], Aug. 12, 2019, 5 pages.

(Continued)

*Primary Examiner* — J. Brant Murphy
(74) *Attorney, Agent, or Firm* — Amin, Turocy & Watson, LLP

(57) ABSTRACT

Systems, computer-implemented methods, and computer program products to facilitate conditional parallel coordinates in automated artificial intelligence with constraints are provided. According to an embodiment, a system can comprise a memory that stores computer executable components and a processor that executes the computer executable components stored in the memory. The computer executable components can comprise a visualization component that renders a pipeline constraint as a constraint axis having constraint scores of machine learning pipelines in a conditional parallel coordinates visualization. The computer executable components can further comprise a model generation component that generates a machine learning model based on the constraint scores of the machine learning pipelines.

20 Claims, 13 Drawing Sheets

(56) References Cited

U.S. PATENT DOCUMENTS

| | | | |
|---|---|---|---|
| 2020/0097853 A1* | 3/2020 | Golovin | G06N 7/005 |
| 2020/0111018 A1* | 4/2020 | Golovin | G06F 11/3409 |
| 2020/0167691 A1* | 5/2020 | Golovin | G06N 3/08 |
| 2021/0042570 A1* | 2/2021 | Iskandar | G06K 9/6228 |
| 2021/0049699 A1* | 2/2021 | Chiu | G06N 20/00 |
| 2022/0134537 A1* | 5/2022 | Chadalavada Vijay Kumar | B25J 9/023 700/250 |

OTHER PUBLICATIONS

Weidele et al., "AutoAIViz: Opening the Blackbox of Automated Artificial Intelligence with Conditional Parallel Coordinates," arXiv:1912.06723v3 [cs.LG], Jan. 17, 2020, 5 pages.

"IBM / Conditional Parallel Coordinates" https://github.com/IBM/conditional-parallel-coordinates, 3 pages.

"Conditional Parallel Coordinates (CPC)" https://www.reddit.com/r/visualization/comments/e9ewwm/conditional_parallel_coordinates_cpc/, 2 pages.

Vosough et al., "Parallel Hierarchies: A Visualization for Cross-tabulating Hierarchical Categories," Computers & Graphics, 76, Aug. 2018, 20 pages.

Huang et al., "A novel virtual node approach for interactive visual analytics of big datasets in parallel coordinates," Future Generation Computer Systems vol. 55, Feb. 2016, 14 pages.

Swersky, et al., "Freeze-Thaw Bayesian Optimization," arXiv:1406.3896v1 [stat.ML], Jun. 16, 2014, 12 pages.

Park, et al., "Visualhypertuner: Visual Analytics for User-Driven Hyperparamter Tuning of Deep Neural Networks," Proceedings of the 2 nd SysML Conference, 2019, 2 pages.

Liu, et al., "An ADMM Based Framework for AutoML Pipeline Configuration," arXiv:1905.00424v5 [cs.LG], Dec. 6, 2019, 30 pages.

Weidele et al., "AutoAIViz: Opening the Blackbox of Automated Arlificial Intelligence with Conditional Parallel Coordinates," arXiv:1912.06723v3 [cs.LG], Jan. 17, 2020, 5 pages.

Mell et al., "The NIST Definition of Cloud Computing," Recommendations of the National Institute of Standards and Technology, NIST Special Publication 800-145, Sep. 2011, 7 pages.

* cited by examiner

CONDITIONAL PARALLEL COORDINATES IN AUTOMATED ARTIFICIAL INTELLIGENCE WITH CONSTRAINTS

BACKGROUND

The subject disclosure relates to automated artificial intelligence, and more specifically, to conditional parallel coordinates in automated artificial intelligence with constraints.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate conditional parallel coordinates in automated artificial intelligence with constraints are described.

According to an embodiment, a system can comprise a memory that stores computer executable components and a processor that executes the computer executable components stored in the memory. The computer executable components can comprise a visualization component that renders a pipeline constraint as a constraint axis having constraint scores of machine learning pipelines in a conditional parallel coordinates visualization. The computer executable components can further comprise a model generation component that generates a machine learning model based on the constraint scores of the machine learning pipelines.

According to another embodiment, a computer-implemented method can comprise rendering, by a system operatively coupled to a processor, a pipeline constraint as a constraint axis having constraint scores of machine learning pipelines in a conditional parallel coordinates visualization. The computer-implemented method can further comprise generating, by the system, a machine learning model based on the constraint scores of the machine learning pipelines.

According to another embodiment, a computer program product facilitating an automated machine learning model generation process is provided. The computer program product comprising a computer readable storage medium having program instructions embodied therewith, the program instructions executable by a processor to cause the processor to render, by the processor, a pipeline constraint as a constraint axis having constraint scores of machine learning pipelines in a conditional parallel coordinates visualization. The program instructions are further executable by the processor to cause the processor to generate, by the processor, a machine learning model based on the constraint scores of the machine learning pipelines.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Artificial Intelligence (AI) can now automate the algorithm selection, feature engineering, and hyperparameter tuning steps in a machine learning workflow. Commonly known as Automated Machine Learning (AutoML) or Automated Artificial Intelligence (AutoAI), these technologies aim to relieve data scientists from the tedious manual work. However, a problem with existing AutoAI systems is that they often present only limited to no information about the process of how and/or why they select and generate model results. Thus, users often do not understand the process, neither do they trust the outputs.

This "blackbox" nature of AutoAI operation described above hinders the collaboration between data scientists and AutoAI systems. Several solutions have been proposed to make AutoAI more transparent in its operation in order to increase trust. These proposals include documenting the process by which machine learning models were created and using visualizations to show the search space of candidate algorithms or hyperparameter values. However, a problem with these solutions is that they either document the state of an AI model after it has been created, or focus only on one step of the model generation workflow (e.g., search algorithms or selecting hyperparameters). Another problem with such solutions is that they do not provide users with an overview of how an AutoAI system works in operation, from the moment data are read to the moment candidate models are produced.

Figure 1:
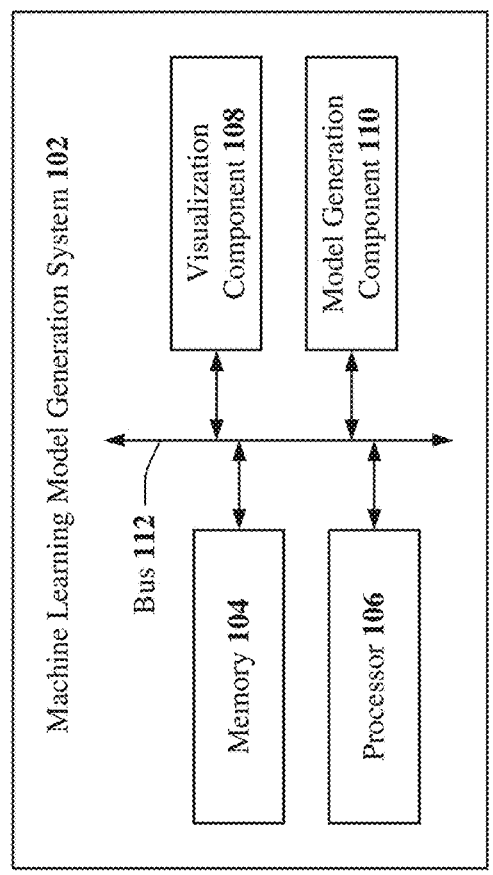
FIG. 1 illustrates a block diagram of an example, non-limiting system that can facilitate conditional parallel coordinates in automated artificial intelligence with constraints in accordance with one or more embodiments described herein.

FIG. 1 illustrates a block diagram of an example, non-limiting system 100 that can facilitate conditional parallel coordinates in automated artificial intelligence with constraints in accordance with one or more embodiments described herein. System 100 can comprise a machine learning model generation system 102, which can be associated with a cloud computing environment. For example, machine learning model generation system 102 can be associated with cloud computing environment 1150 described below with reference to FIG. 11 and/or one or more functional abstraction layers described below with reference to FIG. 12 (e.g., hardware and software layer 1260, virtualization layer 1270, management layer 1280, and/or workloads layer 1290).

Machine learning model generation system 102 and/or components thereof (e.g., visualization component 108, model generation component 110, etc.) can employ one or more computing resources of cloud computing environment 1150 described below with reference to FIG. 11 and/or one or more functional abstraction layers (e.g., quantum software, etc.) described below with reference to FIG. 12 to execute one or more operations in accordance with one or more embodiments of the subject disclosure described herein. For example, cloud computing environment 1150 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by machine learning model generation system 102 and/or components thereof to execute one or more operations in accordance with one or more embodiments of the subject disclosure described herein. For instance, machine learning model generation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As illustrated in FIG. 1, machine learning model generation system 102 can comprise a memory 104, a processor 106, a visualization component 108, a model generation component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or machine learning model generation system 102 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to machine learning model generation system 102, visualization component 108, model generation component 110, and/or another component associated with machine learning model generation system 102, as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 1014 and FIG. 10. Such examples of processor 106 can be employed to implement any embodiments of the subject disclosure.

Machine learning model generation system 102, memory 104, processor 106, visualization component 108, model generation component 110, and/or another component of machine learning model generation system 102 as described herein can be communicatively, electrically, operatively, and/or optically coupled to one another via a bus 112 to perform functions of system 100, machine learning model generation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 1018 and FIG. 10. Such examples of bus 112 can be employed to implement any embodiments of the subject disclosure.

Machine learning model generation system 102 can comprise any type of component, machine, device, facility, apparatus, and/or instrument that comprises a processor and/or can be capable of effective and/or operative communication with a wired and/or wireless network. All such embodiments are envisioned. For example, machine learning model generation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Machine learning model generation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, machine learning model generation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, machine learning model generation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, machine learning model generation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between machine learning model generation system 102 and external systems, sources, and/or devices (e.g., computing devices, communication devices, etc.).

Machine learning model generation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with machine learning model generation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, visualization component 108, model generation component 110, and/or any other components associated with machine learning model generation system 102 as disclosed herein (e.g., communicatively, electronically, operatively, and/or optically coupled with and/or employed by machine learning model generation system 102), can comprise such computer and/or machine readable, writable, and/or executable component(s) and/or instruction(s). Consequently, according to numerous embodiments, machine learning model generation system 102 and/or any components associated therewith as disclosed herein, can employ processor 106 to execute such computer and/or machine readable, writable, and/or executable component(s) and/or instruction(s) to facilitate performance of one or more operations described herein with reference to machine learning model generation system 102 and/or any such components associated therewith.

Machine learning model generation system 102 can facilitate (e.g., via processor 106) performance of operations executed by and/or associated with visualization component 108 and/or model generation component 110, and/or another component associated with machine learning model generation system 102 as disclosed herein. For example, as described in detail below, machine learning model generation system 102 can facilitate via processor 106 (e.g., a classical processor, a quantum processor, etc.): rendering a pipeline constraint as a constraint axis having constraint scores of machine learning pipelines in a conditional parallel coordinates visualization; and/or generating a machine learning model based on the constraint scores of the machine learning pipelines.

In another example, as described in detail below, where the pipeline constraint comprises an optimization metric, machine learning model generation system 102 can further facilitate via processor 106 (e.g., a classical processor, a quantum processor, etc.) rendering the optimization metric as an optimization metric axis having optimization metric scores of the machine learning pipelines in the conditional parallel coordinates visualization. In another example, as described in detail below, where the constraint axis comprises at least one of a visual threshold indicative of a value corresponding to the pipeline constraint or a coding system indicative of different values corresponding to the pipeline constraint, machine learning model generation system 102 can further facilitate via processor 106 (e.g., a classical processor, a quantum processor, etc.) rendering the constraint scores of the machine learning pipelines as polylines crossing the constraint axis. In another example, as described in detail below, machine learning model generation system 102 can further facilitate via processor 106 (e.g., a classical processor, a quantum processor, etc.): rendering a pipeline identification axis comprising the machine learning pipelines rendered as polylines in the conditional parallel coordinates visualization, where the polylines cross one or more axes in the conditional parallel coordinates visualization; rendering a consistent orientation of the constraint scores of the machine learning pipelines in the constraint axis and optimization metric scores of the machine learning pipelines in an optimization metric axis in the conditional parallel coordinates visualization; and/or defining at least one of the pipeline constraint, a value corresponding to the pipeline constraint, one or more features of the constraint axis, or one or more features of one or more second axes in the conditional parallel coordinates visualization, thereby facilitating at least one of improved selection of a machine learning pipeline to generate the machine learning model or improved performance of the system or the processor in generating the machine learning model based on the constraint scores of the machine learning pipelines. In the examples above: the conditional parallel coordinates visualization can comprise an interactive conditional parallel coordinates visualization; and/or at least one of the constraint axis or one or more second axes in the conditional parallel coordinates visualization can comprise expandable dimensions having one or more subdimension axes through which the machine learning pipelines cross.

Visualization component 108 can render a pipeline constraint as a constraint axis having constraint scores of machine learning pipelines in a conditional parallel coordinates (CPC) visualization. For example, based on receiving a conditional parallel coordinates (CPC) visualization as input, visualization component 108 can map to the CPC visualization one or more pipeline constraints as one or more constraint axes in the CPC visualization (e.g., constraint axes 208 and/or 210 described below and illustrated in FIGS. 2, 4, 5, 6, and 8). In this example, such one or more pipeline constraints can comprise constraint(s) that can be imposed on the machine learning pipelines of the CPC visualization including, but not limited to: false positive rate of the respective machine learning pipelines of the CPC visualization; the amount of memory used by the respective machine learning pipelines of the CPC visualization; the average prediction time of the respective machine learning pipelines of the CPC visualization; the absolute error rate difference of the respective machine learning pipelines of the CPC visualization; the absolute static parity difference; and/or another constraint (e.g., one or more optimization metrics described below). In this example, the pipeline constraint and the constraint score of each machine learning pipeline of the CPC visualization can comprise numerical values that can be compared (e.g., by an entity as defined herein that implements machine learning model generation system 102) to determine whether one or more of the machine learning pipelines satisfy the pipeline constraint.

In the examples above, visualization component 108 can receive the CPC visualization via an interface component (not illustrated in the figures) of machine learning model generation system 102. For instance, visualization component 108 can receive the CPC visualization via an interface component (not illustrated in the figures) of machine learning model generation system 102 including, but not limited to, an application programming interface (API), a representational state transfer API, a graphical user interface (GUI), and/or another interface component.

To facilitate such rendering and/or mapping of the one or more pipeline constraints as one or more constraint axes in the CPC visualization as described above, visualization component 108 can employ one or more rendering and/or mapping applications and/or techniques (e.g., rendering application(s), mapping application(s), rendering script(s), mapping script(s), etc.). For example, the CPC visualization can comprise an interactive CPC visualization and visualization component 108 can employ a rendering application such as, for instance, a real-time rendering application that can enable visualization component 108 to render the one or more constraint axes in the CPC visualization. In this example, visualization component 108 can employ such a real-time rendering application to render the one or more constraint axes in such an interactive CPC visualization as interactive components (e.g., interactive axes).

Visualization component 108 can employ such one or more rendering and/or mapping applications and/or techniques described above (e.g., a real-time rendering application) to render one or more other axes and/or one or more other components of the CPC visualization as one or more interactive axes and/or one or more interactive components in the CPC visualization. For instance, visualization component 108 can employ such one or more rendering and/or mapping applications and/or techniques described above (e.g., a real-time rendering application) to render a pipeline identification axis in the CPC visualization, where such a pipeline identification axis can comprise a list of the machine learning pipelines that can be analyzed using the CPC visualization (e.g., analyzed by an entity such as, for instance, a human, a client, a user, a computing device, a software application, an agent, a machine learning (ML) model, an artificial intelligence (AI) model, etc.). In this example, visualization component 108 can employ such one or more rendering and/or mapping applications and/or techniques described above (e.g., a real-time rendering application) to render such machine learning pipelines as polylines in the CPC visualization, where the polylines can comprise interactive polylines that cross one or more axes in the CPC visualization.

In an example, as described below and illustrated in FIGS. 2 and 4, visualization component 108 can render the machine learning pipelines as polylines crossing the constraint axis, where the location at which a certain polyline crosses the constraint axis indicates the constraint score of the machine learning pipeline represented by such a polyline (e.g., as illustrated by polyline 302 crossing pipeline attribute constraint axis 208*a* at axis crossing 402 depicted in FIG. 4). In another example, as described below and illustrated in FIGS. 2 and 4, the constraint axis that can be rendered by visualization component 108 as described above can comprise a visual threshold (e.g., threshold 404*a*, 404*b*, 404*c*, 404*d*, and/or 404*e* depicted in FIG. 4) indicative of a value corresponding to the pipeline constraint, where polylines crossing the constraint axis on one side of the threshold can denote machine learning pipelines that satisfy the pipeline constraint and polylines crossing the constraint axis on another side of the threshold can denote machine learning pipelines that do not satisfy the pipeline constraint. In another example, as described below and illustrated in FIGS. 2, 3, and 7, visualization component 108 can employ such one or more rendering and/or mapping applications and/or techniques described above (e.g., a real-time rendering application) to render one or more axes (e.g., estimator axis 206) in the CPC visualization as expandable dimensions (e.g., estimators 206*a*, 206*b*, 206*c*, 206*d*, and/or 206*e*) having one or more subdimension axes (e.g., subdimension axes 702) through which the machine learning pipelines cross (e.g., through which the interactive polylines representing the machine learning pipelines described above cross).

Figure 4:
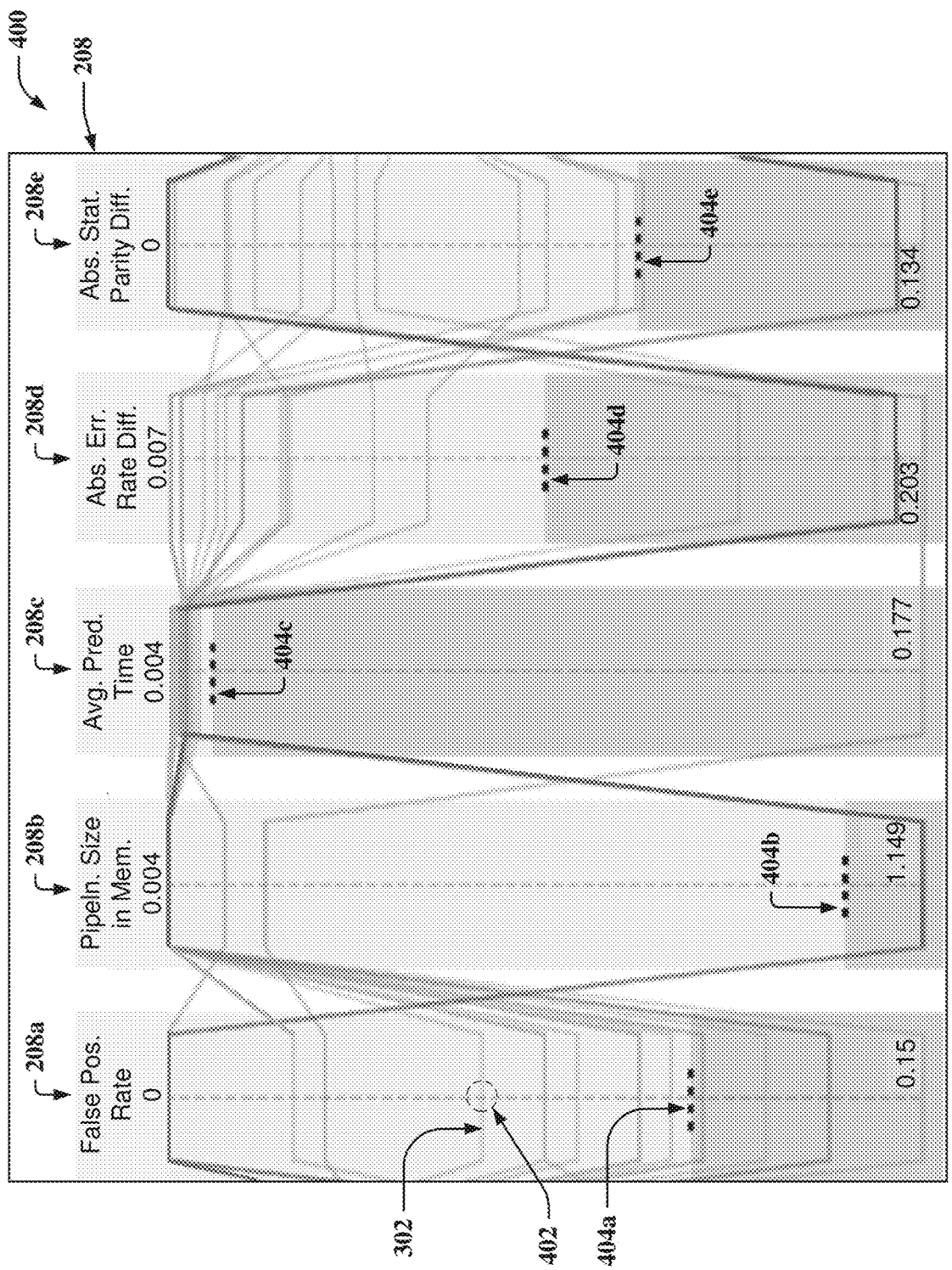
FIG. 4 illustrates a diagram of an example, non-limiting visualization that can facilitate conditional parallel coordinates in automated artificial intelligence with constraints in accordance with one or more embodiments described herein.

In another example, as described below and illustrated in FIGS. 2 and 4, the constraint axis that can be rendered by visualization component 108 as described above can comprise a coding system indicative of different values corresponding to the pipeline constraint (e.g., a light gray hue to denote values above the pipeline constraint value and a dark gray hue to denote values below the pipeline constraint value as depicted in FIG. 4). In this example, a polyline that crosses the constraint axis within a certain colored area of the constraint axis can denote a machine learning pipeline that is within the value of the pipeline constraint (e.g., can denote a machine learning pipeline that satisfies the pipeline constraint), while a polyline that crosses the constraint axis at a location that is not within such a certain colored area of the constraint axis can denote a machine learning pipeline that is not within the value of the pipeline constraint (e.g., can denote a machine learning pipeline that does not satisfy the pipeline constraint).

In some embodiments, an entity can define the pipeline constraint, a value corresponding to the pipeline constraint, one or more features of the constraint axis (e.g., the coding system described above), and/or one or more features of one or more second axes (e.g., the optimization metric axis described below) in the CPC visualization. For example, as described above, machine learning model generation system 102 can comprise an interface component (e.g., an API, a REST API, a GUI, etc.) that can be utilized by an entity (e.g., a human, a client, a user, a computing device, a software application, an agent, a machine learning (ML) model, an artificial intelligence (AI) model, etc.) to define such elements described above in the CPC visualization.

In some embodiments, the pipeline constraint described above can comprise an optimization metric. In these embodiments, visualization component 108 can employ such one or more rendering and/or mapping applications and/or techniques described above (e.g., a real-time rendering application) to render one or more of such an optimization metric as one or more optimization metric axes having optimization metric scores of the machine learning pipelines in the CPC visualization described above. For example, based on receiving a CPC visualization as input, visualization component 108 can employ such one or more rendering and/or mapping applications and/or techniques described above (e.g., a real-time rendering application) to render such a pipeline constraint comprising an optimization metric as an optimization metric axis in the CPC visualization (e.g., optimization metric axes 210a, 210b, 210c, 210d, 210e, and/or 210f described below and illustrated in FIGS. 2, 5, 6, and 8). In this example, such an optimization metric can comprise a constraint that can be imposed on the machine learning pipelines of the CPC visualization including, but not limited to: accuracy of the respective machine learning pipelines of the CPC visualization; average precision of the respective machine learning pipelines of the CPC visualization; Fi scores (also referred to as F-scores or F-measures) of the respective machine learning pipelines of the CPC visualization; precision of the respective machine learning pipelines of the CPC visualization; recall of the respective machine learning pipelines of the CPC visualization; receiver operating characteristic area under curve (RO-CAUC) scores of the respective machine learning pipelines of the CPC visualization; and/or another optimization metric. In this example, the optimization metric scores of the machine learning pipelines of the CPC visualization can comprise numerical values, where such optimization metric scores corresponding to one or more certain optimization metric axes can be compared (e.g., by an entity (e.g., an automated artificial intelligence (AutoAI) entity) that implements machine learning model generation system 102) to determine which of the machine learning pipelines perform best with respect to such one or more certain optimization metric axes, relative to the other machine learning pipelines in the CPC visualization.

Visualization component 108 can employ such one or more rendering and/or mapping applications and/or techniques described above (e.g., a real-time rendering application) to render a consistent orientation of the constraint scores of the machine learning pipelines in the constraint axis and the optimization metric scores of the machine learning pipelines in the optimization metric axis described above. For instance, the numerical values described above that can denote the constraint scores and/or the optimization metric scores can comprise positive numerical values or negative numerical values that can indicate either satisfactory or unsatisfactory scores of the machine learning pipelines in the CPC visualization. In this example, visualization component 108 can render a consistent orientation of the constraint scores and the optimization metric scores in the constraint axes and the optimization metric axes, respectively, such that satisfactory scores are positioned in a certain location on all such axes (e.g., at the top of the axes as described below and illustrated by dashed box 602a depicted in FIG. 6) and unsatisfactory scores are positioned in another location on all such axes (e.g., at the bottom of the axes as described below and illustrated by dashed box 602b depicted in FIG. 6).

Model generation component 110 can generate a machine learning model based on the constraint scores and/or the optimization metric scores of the machine learning pipelines in the CPC visualization. For example, model generation component 110 can comprise an automated artificial intelligence (AutoAI) entity (e.g., a computing device, a software application, an agent, a machine learning (ML) model, an artificial intelligence (AI) model, etc.) that can: employ the CPC visualization described above to analyze various machine learning pipelines based on various attributes (e.g., various transformers, estimators, pipeline constraints, optimization metrics, etc.), the constraint scores, and/or the optimization metric scores of such machine learning pipelines; select a machine learning pipeline that satisfies a defined objective (e.g., the machine learning pipeline having the best constraint scores and/or optimization metric scores relative to other machine learning pipelines); and/or generate a machine learning model by implementing the steps of the selected machine learning pipeline (e.g., by implementing the transformation steps of the selected machine learning pipeline, training the estimator of the selected machine learning pipeline, and/or fine-tuning the hyperparameters of the selected machine learning pipeline).

Figure 2:
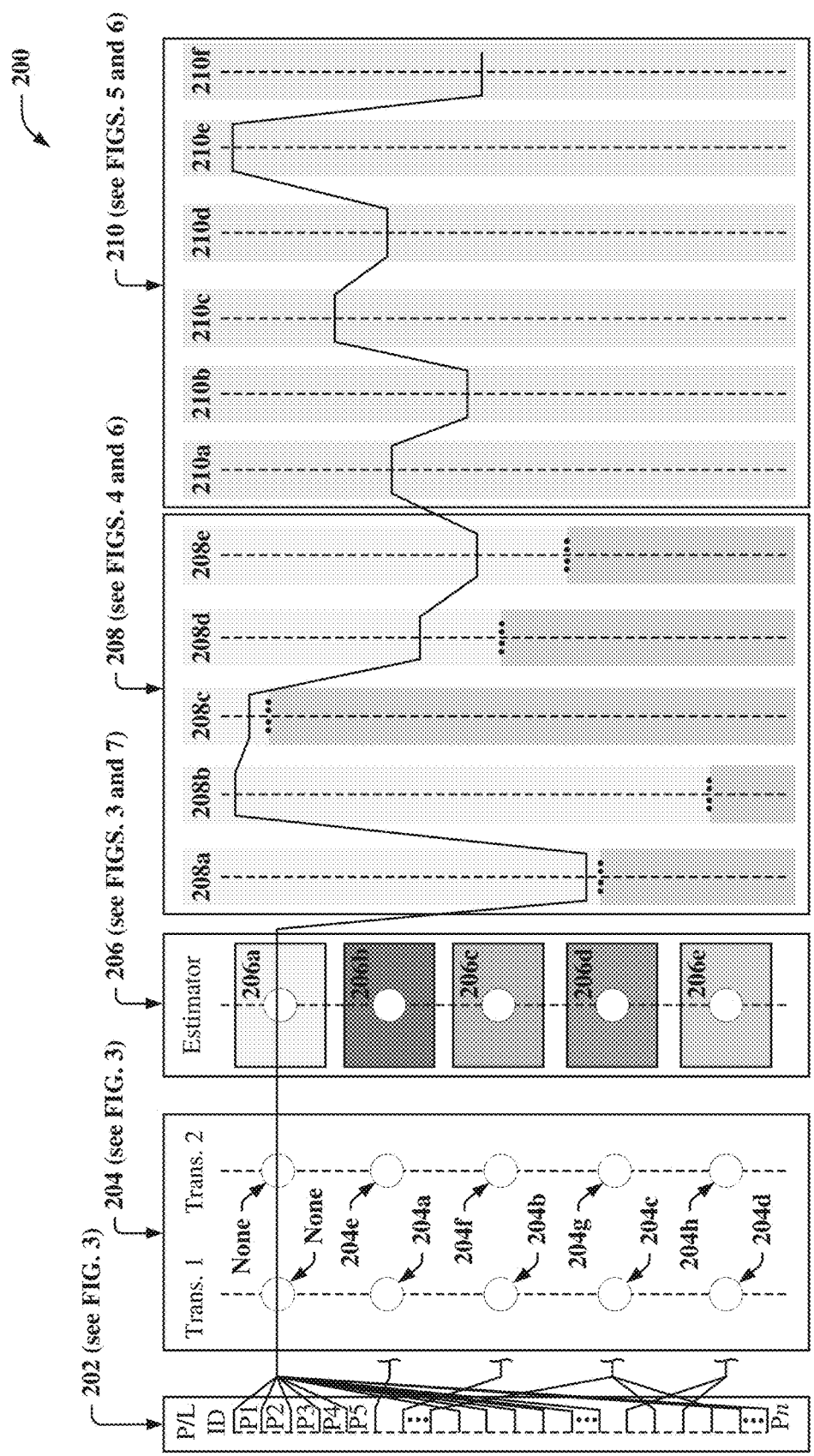
FIG. 2 illustrates a diagram of an example, non-limiting visualization that can facilitate conditional parallel coordinates in automated artificial intelligence with constraints in accordance with one or more embodiments described herein.

FIG. 2 illustrates a diagram of an example, non-limiting visualization 200 that can facilitate conditional parallel coordinates in automated artificial intelligence with constraints in accordance with one or more embodiments described herein. Repetitive description of like elements and/or processes employed in respective embodiments is omitted for sake of brevity.

Visualization 200 can comprise a conditional parallel coordinates (CPC) visualization that can be partially or entirely generated by machine learning model generation system 102 (e.g., via visualization component 108 as described above with reference to FIG. 1). Visualization 200 can comprise a CPC visualization that can be utilized by an automated artificial intelligence (AutoAI) entity such as, for instance, model generation component 110 to generate a machine learning model based on constraints (e.g., to generate a machine learning model based on pipeline constraints and/or optimization metrics as described above with reference to FIG. 1).

As illustrated in FIG. 2, visualization 200 can comprise one or more sections (denoted by the boxes outlining the respective sections in FIG. 2). For instance, visualization 200 can comprise: a pipeline identification section comprising a pipeline identification axis 202 (denoted as P/L ID in FIG. 2); a transformation section comprising transformation axes 204 (e.g., a Transformer 1 axis and a Transformer 2 axis denoted as Trans. 1 and Trans. 2, respectively, in FIG. 2); an estimator section comprising an estimator axis 206; and/or pipeline constraint sections comprising constraint axes 208 and/or 210.

For purposes of clarity, such sections of visualization 200 defined above are described in detail below as inset views of visualization 200 and illustrated in various figures of the subject disclosure. More specifically, as denoted in FIG. 2: the pipeline identification section comprising pipeline identification axis 202 is described below and illustrated in FIG. 3; the transformation section comprising transformation axes 204 is described below and illustrated in FIG. 3; the estimator section comprising estimator axis 206 is described below and illustrated in FIGS. 3 and 7; the pipeline constraint section comprising constraint axes 208 is described below and illustrated in FIGS. 4 and 6; and the pipeline constraint section comprising constraint axes 210 is described below and illustrated in FIGS. 5 and 6.

Pipeline identification axis 202 of visualization 200 can comprise the pipeline identification axis described above with reference to FIG. 1 that can be rendered by visualization component 108 (e.g., via employing the one or more rendering and/or mapping applications and/or techniques described above such as, for instance, a real-time rendering application). For clarity, while pipeline identification axis 202 illustrated in FIG. 2 depicts multiple machine learning pipelines (denoted P1-Pn in FIG. 2, where n represents a total quantity of machine learning pipelines), only a single machine learning pipeline is shown extending across all sections and axes of visualization 200 in FIG. 2. However, as described below and illustrated in FIGS. 3-8, such machine learning pipelines (e.g., P1-Pn) can be represented as polylines 302 (e.g., interactive polylines) that can extend across all sections and axes of visualizations 200, 300, 400, 500, 600, 700, and/or 800.

The transformation section of visualization 200 comprising transformation axes 204 can comprise a first transformer axis (e.g., Transformer 1 denoted as Trans. 1 in FIG. 2) and/or a second transformer axis (e.g., Transformer 2 denoted as Trans. 2 in FIG. 2) through which one or more machine learning pipelines can cross. For example, as depicted in FIG. 2, the first transformer axis denoted as Transformer 1 can comprise one or more transformers 204a, 204b, 204c, and/or 204d and the second transformer axis denoted as Transformer 2 can comprise one or more transformers 204e, 204f, 204g, and/or 204h. In another example, as depicted in FIG. 2, Transformer 1 axis and/or Transformer 2 axis can comprise no transformer (denoted as None in FIG. 2) through which one or more machine learning pipelines cross. As described above and denoted in FIG. 2, for clarity, the transformation section of visualization 200 comprising transformation axes 204 is described below and illustrated in FIG. 3.

The estimator section of visualization 200 comprising estimator axis 206 can comprise one or more estimators through which one or more machine learning pipelines can cross. For example, as depicted in FIG. 2, estimator axis 206 can comprise one or more estimators 206a, 206b, 206c, 206d, and/or 206e. As described above and denoted in FIG. 2, for clarity, the estimator section of visualization 200 comprising estimator axis 206 is described below and illustrated in FIGS. 3 and 7.

The pipeline constraint sections of visualization 200 comprising constraint axes 208 and/or 210 can comprise the constraint axes described above with reference to FIG. 1 that can be rendered by visualization component 108 (e.g., via employing the one or more rendering and/or mapping applications and/or techniques described above such as, for instance, a real-time rendering application). In an example, constraint axes 208 can comprise one or more pipeline attribute constraint axes 208a, 208b, 208c, 208d, and/or 208e through which one or more machine learning pipelines can cross. In another example, constraint axes 210 can comprise one or more optimization metric axes such as, for instance, optimization metric axes 210a, 210b, 210c, 210d, 210e, and/or 210f through which one or more machine learning pipelines can cross. As described above and denoted in FIG. 2, for clarity, the pipeline constraint section of visualization 200 comprising constraint axes 208 is described below and illustrated in FIGS. 4 and 6, and the pipeline constraint section of visualization 200 comprising constraint axes 210 is described below and illustrated in FIGS. 5 and 6.

Figure 3:
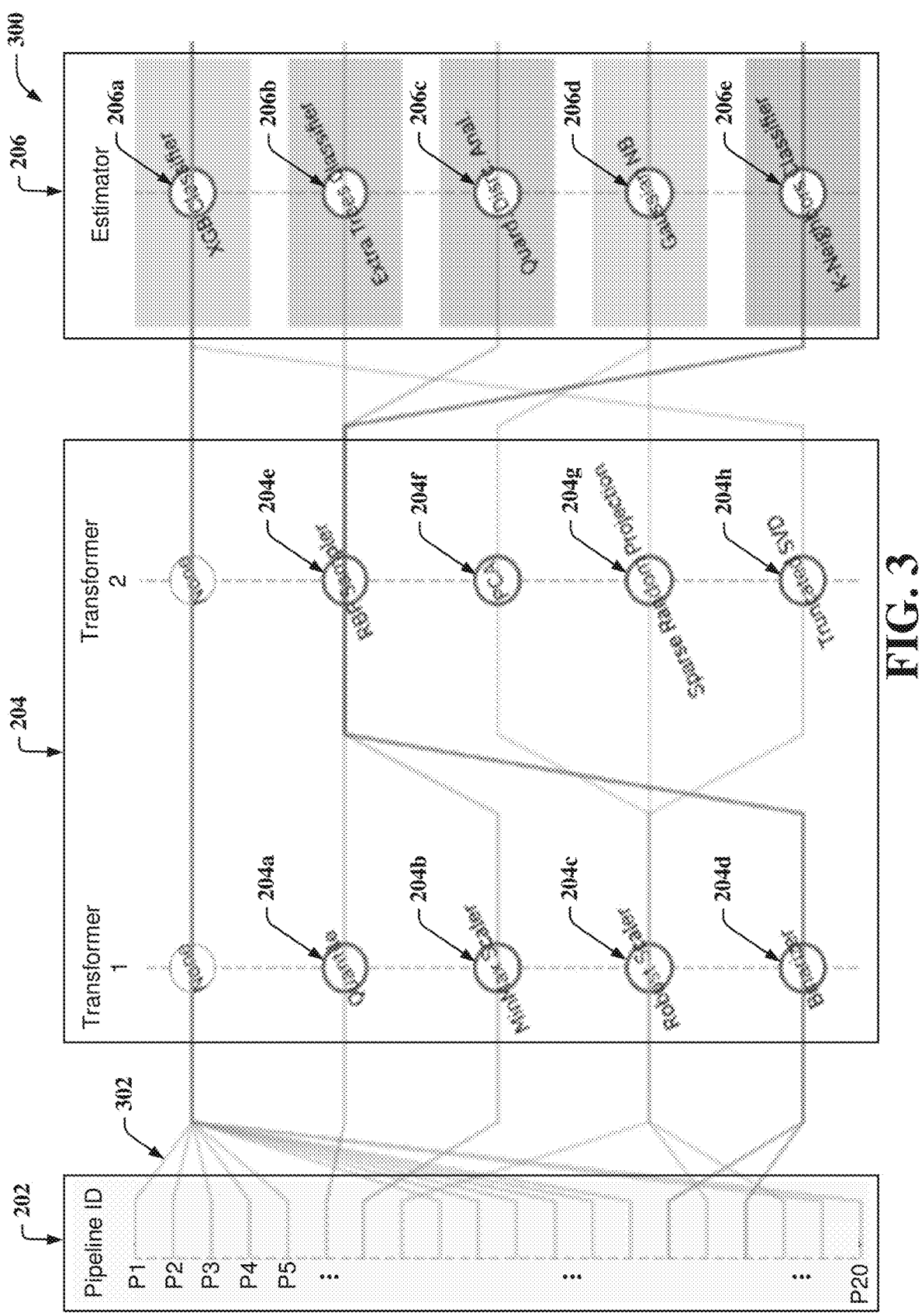
FIG. 3 illustrates a diagram of an example, non-limiting visualization that can facilitate conditional parallel coordinates in automated artificial intelligence with constraints in accordance with one or more embodiments described herein.

FIG. 3 illustrates a diagram of an example, non-limiting visualization 300 that can facilitate conditional parallel coordinates in automated artificial intelligence with constraints in accordance with one or more embodiments described herein. Repetitive description of like elements and/or processes employed in respective embodiments is omitted for sake of brevity.

Visualization 300 can comprise an inset view of pipeline identification axis 202, transformation axes 204, and/or estimator axis 206 of visualization 200 described above and illustrated in FIG. 2. Pipeline identification axis 202 can comprise one or more machine learning pipelines of visualization 200, where such machine learning pipeline(s) are denoted by designators P1 to P20 and are visually represented as polylines 302 in the various figures of the subject disclosure. In an example, polylines 302 can comprise interactive polylines denoting the machine learning pipelines. In this example, each of polylines 302 can be selected (e.g., individually, one at a time) by an entity utilizing visualization 200 (e.g., model generation component 110, a computing device, a software application, an agent, a machine learning (ML) model, an artificial intelligence (AI) model, etc.) to highlight the machine learning pipeline path crossing through the various axes of visualization 200 (e.g., as described below and illustrated in FIG. 8).

Transformation axes 204 can comprise a first transformer axis (denoted as Transformer 1 in FIG. 3) and/or a second transformer axis (denoted as Transformer 2 in FIG. 3) through which one or more machine learning pipelines represented as polylines 302 can cross. As depicted in FIG. 3, the first transformer axis denoted as Transformer 1 can comprise one or more transformers 204a, 204b, 204c, and/or 204d and the second transformer axis denoted as Transformer 2 can comprise one or more transformers 204e, 204f, 204g, and/or 204h. In an example: transformer 204a can comprise a Quantile transformer; transformer 204b can comprise a MinMaxScaler transformer; transformer 204c can comprise a RobustScaler transformer; transformer 204d can comprise a Binarizer transformer; transformer 204e can comprise a Radial Bias Function (RBF) Sampler transformer; transformer 204f can comprise a Principal Component Analysis (PCA) transformer; transformer 204g can comprise a Sparse Random Projection transformer; and/or transformer 204h can comprise a Truncated Singular Value Decomposition (SVD) transformer. In another example, as depicted in FIG. 3, Transformer 1 axis and/or Transformer 2 axis can comprise no transformer (denoted as None in FIG. 3) through which one or more machine learning pipelines cross.

Estimator axis 206 can comprise one or more estimators 206a, 206b, 206c, 206d, and/or 206e through which one or more machine learning pipelines represented as polylines 302 can cross. In an example: estimator 206a can comprise an XGBoost (XGB) Classifier; estimator 206b Extra Trees Classifier; estimator 206c can comprise a Quadratic Discrimination Analysis estimator (denoted as Quard. Disrc. Anal. in FIG. 3); estimator 206d can comprise a Gaussian Naive Bayes (NB); and/or estimator 206e can comprise a K-Neighbors Classifier. In some embodiments, estimators 206a, 206b, 206c, 206d, and/or 206e can comprise interactive components of visualization 200. For example, estimators 206a, 206b, 206c, 206d, and/or 206e can comprise expandable dimensions having one or more subdimension axes (e.g., subdimension axes 702 described below and illustrated in FIG. 7) through which the machine learning pipelines cross (e.g., through which the interactive polylines representing the machine learning pipelines described above cross). In this example, estimators 206a, 206b, 206c, 206d, or 206e can be selected (e.g., individually, one at a time) by an entity utilizing visualization 200 (e.g., model generation component 110, a computing device, a software application, an agent, a machine learning (ML) model, an artificial intelligence (AI) model, etc.) to expand the estimator selected, thereby revealing the one or more subdimension axes (e.g., subdimension axes 702 described below and illustrated in FIG. 7) of the selected estimator through which the machine learning pipelines cross (e.g., through which the interactive polylines representing the machine learning pipelines described above cross).

FIG. 4 illustrates a diagram of an example, non-limiting visualization 400 that can facilitate conditional parallel coordinates in automated artificial intelligence with constraints in accordance with one or more embodiments described herein. Repetitive description of like elements and/or processes employed in respective embodiments is omitted for sake of brevity.

Visualization 400 can comprise an inset view of constraint axes 208 of visualization 200 described above and illustrated in FIG. 2. As illustrated in FIG. 4, constraint axes 208 can comprise one or more pipeline attribute constraint axes 208a, 208b, 208c, 208d, and/or 208e through which one or more machine learning pipelines represented as polylines 302 can cross. Pipeline attribute constraint axes 208a, 208b, 208c, 208d, and/or 208e can be rendered by visualization component 108 as described above with reference to FIG. 1. In an example: pipeline attribute constraint axis 208a can comprise a False Positive Rate constraint axis (denoted as False Pos. Rate in FIG. 4) having a pipeline constraint value of 0; pipeline attribute constraint axis 208b can comprise a Pipeline Size in Memory constraint axis (denoted as Pipeln. Size in Mem. in FIG. 4) having a pipeline constraint value of 0.004; pipeline attribute constraint axis 208c can comprise an Average Prediction Time constraint axis (denoted as Avg. Fred. Time in FIG. 4) having a pipeline constraint value of 0.004; pipeline attribute constraint axis 208d can comprise an Absolute Error Rate Difference constraint axis (denoted as Abs. Err. Rate Diff. in FIG. 4) having a pipeline constraint value of 0.007; and/or pipeline attribute constraint axis 208e can comprise an Absolute Static Parity Difference constraint axis (denoted as Abs. Stat. Parity Diff. in FIG. 4) having a pipeline constraint value of 0.

In an example, the pipeline constraint values of pipeline attribute constraint axes 208a, 208b, 208c, 208d, and/or 208e described above can be rendered by visualization component 108 on each of such axes as thresholds 404a, 404b, 404c, 404d, and/or 404e as depicted in FIG. 4. In this example, machine learning pipelines represented as polylines 302 that cross pipeline attribute constraint axes 208a, 208b, 208c, 208d, and/or 208e above thresholds 404a, 404b, 404c, 404d, and/or 404e, respectively, can comprise machine learning pipelines having constraint scores that are within the pipeline constraint values of the respective pipeline attribute constraint axes 208a, 208b, 208c, 208d, and/or 208e. In this example, machine learning pipelines represented as polylines 302 that cross pipeline attribute constraint axes 208a, 208b, 208c, 208d, and/or 208e below thresholds 404a, 404b, 404c, 404d, and/or 404e, respectively, can comprise machine learning pipelines having constraint scores that are within the pipeline constraint values of the respective pipeline attribute constraint axes 208a, 208b, 208c, 208d, and/or 208e.

Additionally, or alternatively, in another example, pipeline attribute constraint axes 208a, 208b, 208c, 208d, and/or 208e can comprise a coding system indicative of different values corresponding to the pipeline constraint. For instance, the light gray hue depicted in pipeline attribute constraint axes 208a, 208b, 208c, 208d, and 208e can denote values that are above the respective pipeline constraint values of such axes and the dark gray hue in pipeline attribute constraint axes 208a, 208b, 208c, 208d, and 208e can denote values that are below the respective pipeline constraint values of such axes. In an example, machine learning pipelines represented as polylines 302 that cross pipeline attribute constraint axes 208a, 208b, 208c, 208d, and/or 208e within the light gray hue can comprise machine learning pipelines having constraint scores that are within the pipeline constraint values of the respective pipeline attribute constraint axes 208a, 208b, 208c, 208d, and/or 208e. In another example, machine learning pipelines represented as polylines 302 that cross pipeline attribute constraint axes 208a, 208b, 208c, 208d, and/or 208e within the dark gray hue can comprise machine learning pipelines having constraint scores that are not within the pipeline constraint values of the respective pipeline attribute constraint axes 208a, 208b, 208c, 208d, and/or 208e.

As described above with reference to FIG. 1, in some embodiments, an entity can define one or more elements of a CPC visualization such as, for instance, visualization 200. For example, an entity (e.g., model generation component 110, a human, a client, a user, a computing device, a software application, an agent, a machine learning (ML) model, an artificial intelligence (AI) model, etc.) can use an interface component of machine learning model generation system 102 as described above to define: one or more of the pipeline attribute constraint axes 208a, 208b, 208c, 208d, and/or 208e; one or more of the pipeline constraint values corresponding to pipeline attribute constraint axes 208a, 208b, 208c, 208d, and/or 208e; and/or one or more features of the pipeline attribute constraint axes 208a, 208b, 208c, 208d, and/or 208e such as, for instance, the hues of the coding system described above.

Figure 5:
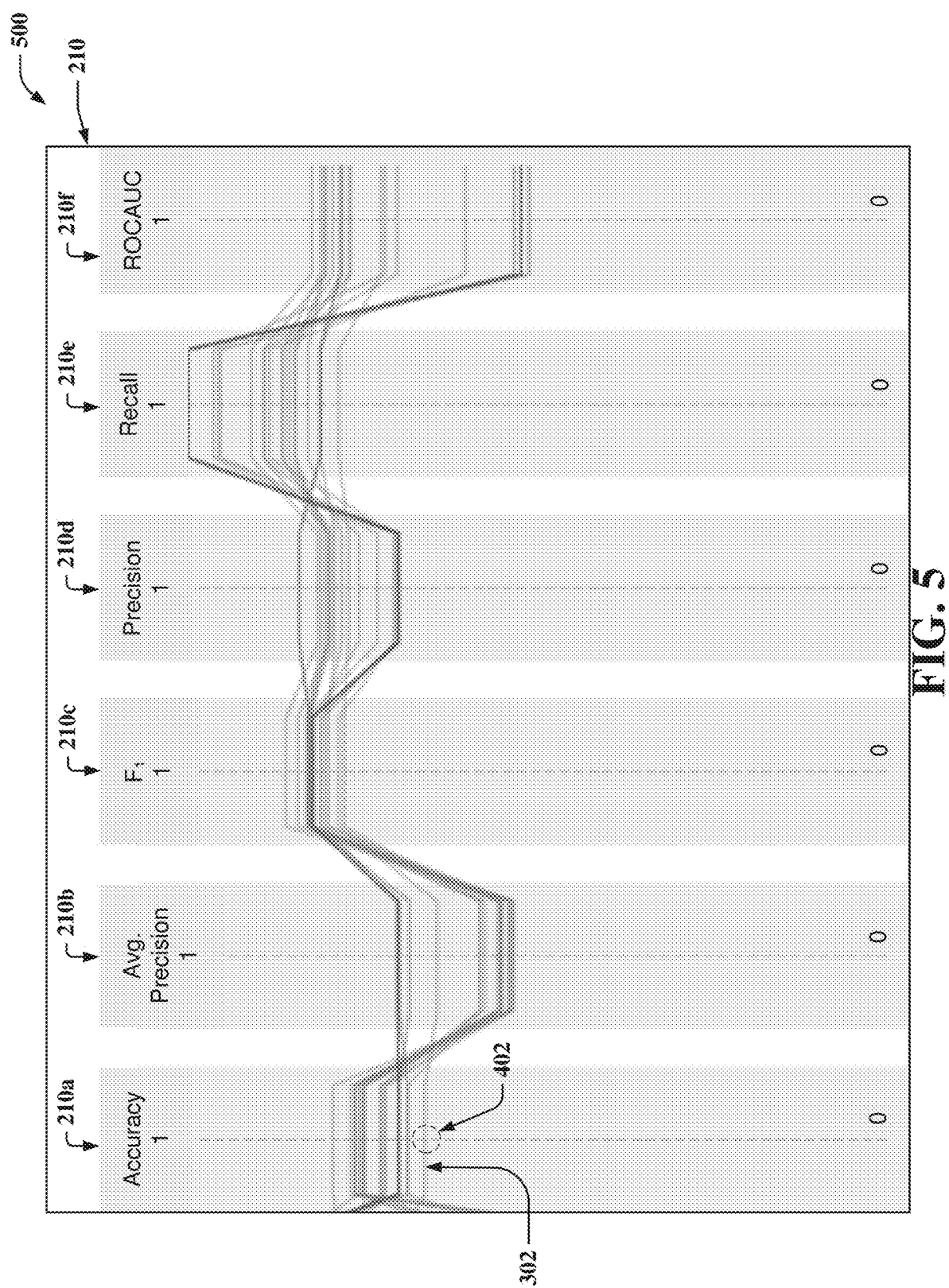
FIG. 5 illustrates a diagram of an example, non-limiting visualization that can facilitate conditional parallel coordinates in automated artificial intelligence with constraints in accordance with one or more embodiments described herein.

FIG. 5 illustrates a diagram of an example, non-limiting visualization 500 that can facilitate conditional parallel coordinates in automated artificial intelligence with constraints in accordance with one or more embodiments described herein. Repetitive description of like elements and/or processes employed in respective embodiments is omitted for sake of brevity.

Visualization 500 can comprise an inset view of constraint axes 210 of visualization 200 described above and illustrated in FIG. 2. As illustrated in FIG. 5, constraint axes 210 can comprise one or more optimization metric axes 210a, 210b, 210c, 210d, 210e, and/or 210f through which one or more machine learning pipelines represented as polylines 302 can cross. Optimization metric axes 210a, 210b, 210c, 210d, 210e, and/or 210f can be rendered by visualization component 108 as described above with reference to FIG. 1. In an example: optimization metric axis 210a can comprise an Accuracy optimization metric axis having optimization metric values ranging between 0 and 1 as depicted in FIG. 5; optimization metric axis 210b can comprise an Average Precision optimization metric axis (denoted as Avg. Precision in FIG. 5) having optimization metric values ranging between 0 and 1 as depicted in FIG. 5; optimization metric axis 210c can comprise an Fi score (also referred to as an F-score or an F-measure) optimization metric axis having optimization metric values ranging between 0 and 1 as depicted in FIG. 5; optimization metric axis 210d can comprise a Precision optimization metric axis having optimization metric values ranging between 0 and 1 as depicted in FIG. 5; optimization metric axis 210e can comprise a Recall optimization metric axis having optimization metric values ranging between 0 and 1 as depicted in FIG. 5; and/or optimization metric axis 210*f* can comprise a Receiver Operating Characteristic Area Under Curve (denoted as ROCAUC in FIG. 5) optimization metric axis having optimization metric values ranging between 0 and 1 as depicted in FIG. 5.

In an example, the location on the respective optimization metric axes 210*a*, 210*b*, 210*c*, 210*d*, 210*e*, and/or 210*f* at which the machine learning pipelines represented as polylines 302 cross can correspond to the optimization metric scores of the respective machine learning pipelines. For instance, as illustrated in FIG. 5, axis crossing 402 can denote the location on optimization metric axis 210*a* at which a certain machine learning pipeline represented as polyline 302 crosses. In this example, the numerical value corresponding to axis crossing 402 (e.g., approximately 0.6) can denote the optimization metric score of such a certain machine learning pipeline.

As described above with reference to FIG. 1, in some embodiments, an entity can define one or more elements of a CPC visualization such as, for instance, visualization 200. For example, an entity (e.g., model generation component 110, a human, a client, a user, a computing device, a software application, an agent, a machine learning (ML) model, an artificial intelligence (AI) model, etc.) can use an interface component of machine learning model generation system 102 as described above to define one or more of the optimization metric axes 210*a*, 210*b*, 210*c*, 210*d*, 210*e*, and/or 210*f*.

Figure 6:
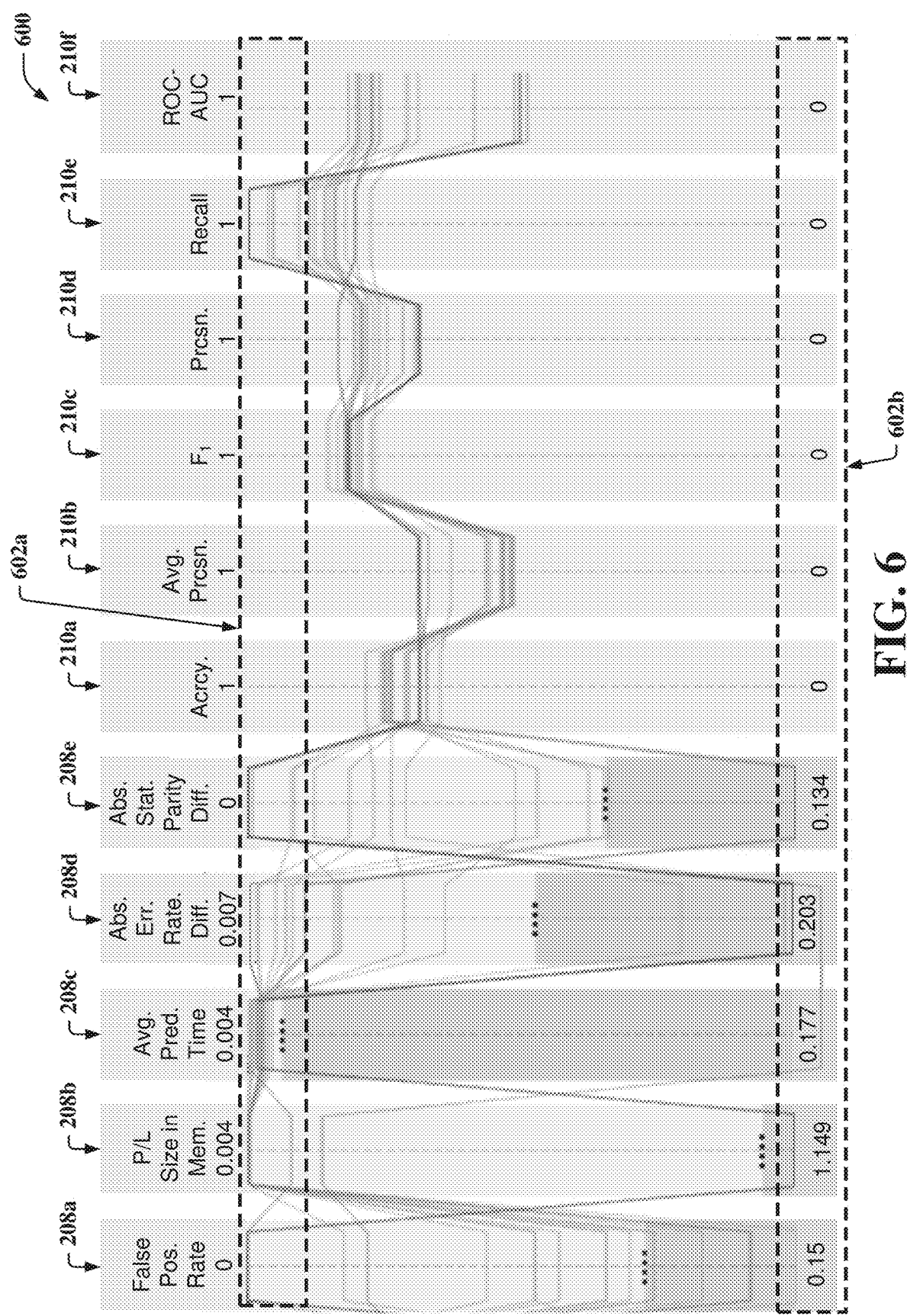
FIG. 6 illustrates a diagram of an example, non-limiting visualization that can facilitate conditional parallel coordinates in automated artificial intelligence with constraints in accordance with one or more embodiments described herein.

FIG. 6 illustrates a diagram of an example, non-limiting visualization 600 that can facilitate conditional parallel coordinates in automated artificial intelligence with constraints in accordance with one or more embodiments described herein. Repetitive description of like elements and/or processes employed in respective embodiments is omitted for sake of brevity.

Visualization 600 can comprise an inset view of constraint axes 208 and 210 of visualization 200 described above and illustrated in FIG. 2. More specifically, visualization 600 can comprise an inset view of pipeline attribute constraint axes 208*a*, 208*b*, 208*c*, 208*d*, and 208*e* and optimization metric axes 210*a*, 210*b*, 210*c*, 210*d*, 210*e*, and 210*f* of visualization 200 described above and illustrated in FIG. 2.

As described above with reference to FIG. 1 and illustrated in FIG. 6, visualization 108 can employ such one or more rendering and/or mapping applications and/or techniques described above (e.g., a real-time rendering application) to render a consistent orientation of the constraint scores of the machine learning pipelines in the pipeline attribute constraint axes 208*a*, 208*b*, 208*c*, 208*d*, and/or 208*e* and the optimization metric scores of the machine learning pipelines in the optimization metric axes 210*a*, 210*b*, 210*c*, 210*d*, 210*e*, and/or 210*f*. For instance, the numerical values described above that can denote the constraint scores and/or the optimization metric scores of the machine learning pipelines can comprise positive numerical values or negative numerical values that can indicate either satisfactory or unsatisfactory scores of such machine learning pipelines. In this example, visualization component 108 can render a consistent orientation of the constraint scores and the optimization metric scores in the pipeline attribute constraint axes 208*a*, 208*b*, 208*c*, 208*d*, and/or 208*e* and the optimization metric axes 210*a*, 210*b*, 210*c*, 210*d*, 210*e*, and/or 210*f*, respectively, such that satisfactory scores are positioned in a certain location on all such axes and unsatisfactory scores are positioned in another location on all such axes. For instance, such satisfactory scores can be positioned at the top of pipeline attribute constraint axes 208*a*, 208*b*, 208*c*, 208*d*, and/or 208*e* and optimization metric axes 210*a*, 210*b*, 210*c*, 210*d*, 210*e*, and/or 210*f* as illustrated by dashed box 602*a* depicted in FIG. 6 and such unsatisfactory scores can be positioned at the bottom of such axes as illustrated by dashed box 602*b* depicted in FIG. 6.

Figure 7:
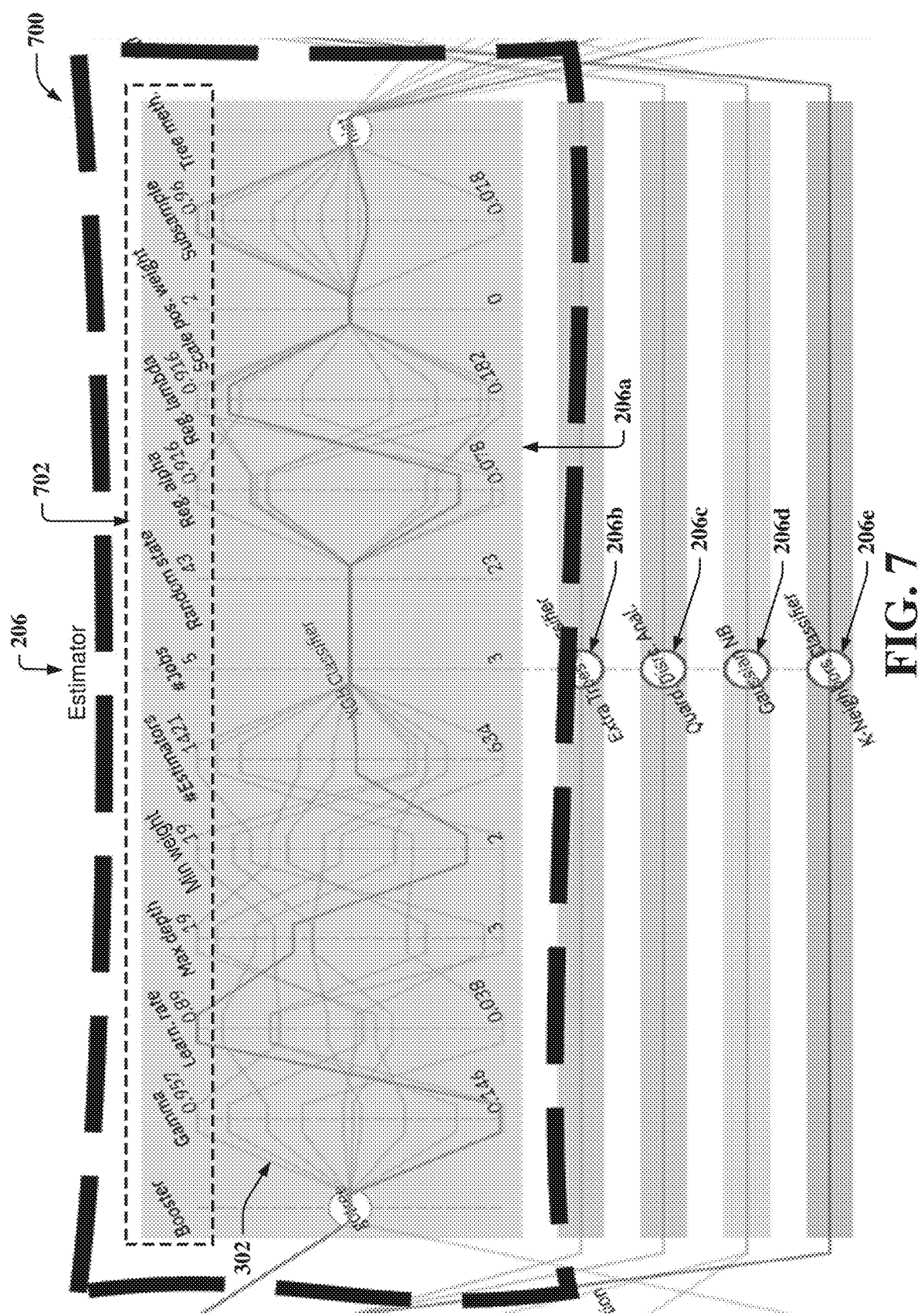
FIG. 7 illustrates a diagram of an example, non-limiting visualization that can facilitate conditional parallel coordinates in automated artificial intelligence with constraints in accordance with one or more embodiments described herein.

FIG. 7 illustrates a diagram of an example, non-limiting visualization 700 that can facilitate conditional parallel coordinates in automated artificial intelligence with constraints in accordance with one or more embodiments described herein. Repetitive description of like elements and/or processes employed in respective embodiments is omitted for sake of brevity.

Visualization 700 can comprise an inset view of estimator axis 206 of visualization 200 described above and illustrated in FIG. 2. More specifically, visualization 700 can comprise an inset view of an expanded estimator 206*a* in estimator axis 206 of visualization 200 described above and illustrated in FIG. 2.

As described above with reference to FIG. 1 and illustrated in FIG. 7, estimators 206*a*, 206*b*, 206*c*, 206*d*, and/or 206*e* of estimator axis 206 can comprise expandable dimensions having one or more subdimension axes 702 through which polylines 302 representing the machine learning pipelines cross. In an example, estimators 206*a*, 206*b*, 206*c*, 206*d*, or 206*e* can be selected individually (e.g., one at a time) by an entity utilizing visualization 200 (e.g., model generation component 110, a computing device, a software application, an agent, a machine learning (ML) model, an artificial intelligence (AI) model, etc.) to expand the estimator selected. In this example, such expansion of the selected estimator can thereby reveal one or more subdimension axes 702 of the selected estimator through which polylines 302 representing the machine learning pipelines cross.

In an example, as illustrated in FIG. 7, estimator 206*a* can comprise an XGBoost Classifier that can be selected by an entity utilizing visualization 200 (e.g., model generation component 110, a computing device, a software application, an agent, a machine learning (ML) model, an artificial intelligence (AI) model, etc.). In this example, based on such selection and as illustrated in FIG. 7, estimator 206*a* can expand to reveal one or more subdimension axes 702 of estimator 206*a* that can include, but are not limited to: a booster axis; a gamma axis; a learning rate axis (denoted as Learn. rate in FIG. 7); a max depth axis; a minimum weight axis (denoted as Min weight in FIG. 7); an estimators axis (denoted as #Estimators in FIG. 7); a jobs axis (denoted as #Jobs in FIG. 7); a random state axis; an alpha axis (denoted as Reg. alpha in FIG. 7); a lambda axis (denoted as Reg. lambda in FIG. 7); a scale positive weight axis (denoted as Scale pos. weight in FIG. 7); a subsample axis; a tree method axis (denoted as Tree meth. in FIG. 7); and/or another subdimension axis.

In the examples above, such an entity utilizing visualization 200 can select each estimator 206*a*, 206*b*, 206*c*, 206*d*, or 206*e* individually (e.g., one at a time) and visualization component 108 can expand only the selected estimator, while collapsing all other estimators. For instance, when such an entity utilizing visualization 200 selects a first estimator 206*a*, 206*b*, 206*c*, 206*d*, or 206*e* to reveal subdimensions 702 of such a selected estimator and then selects a second estimator 206*a*, 206*b*, 206*c*, 206*d*, or 206*e*, visualization component 108 can collapse the previously selected first estimator 206*a*, 206*b*, 206*c*, 206*d*, or 206*e* and can further expand only the second estimator 206*a*, 206*b*, 206*c*, 206*d*, or 206*e* to reveal subdimensions 702 of the second estimator.

Figure 8:
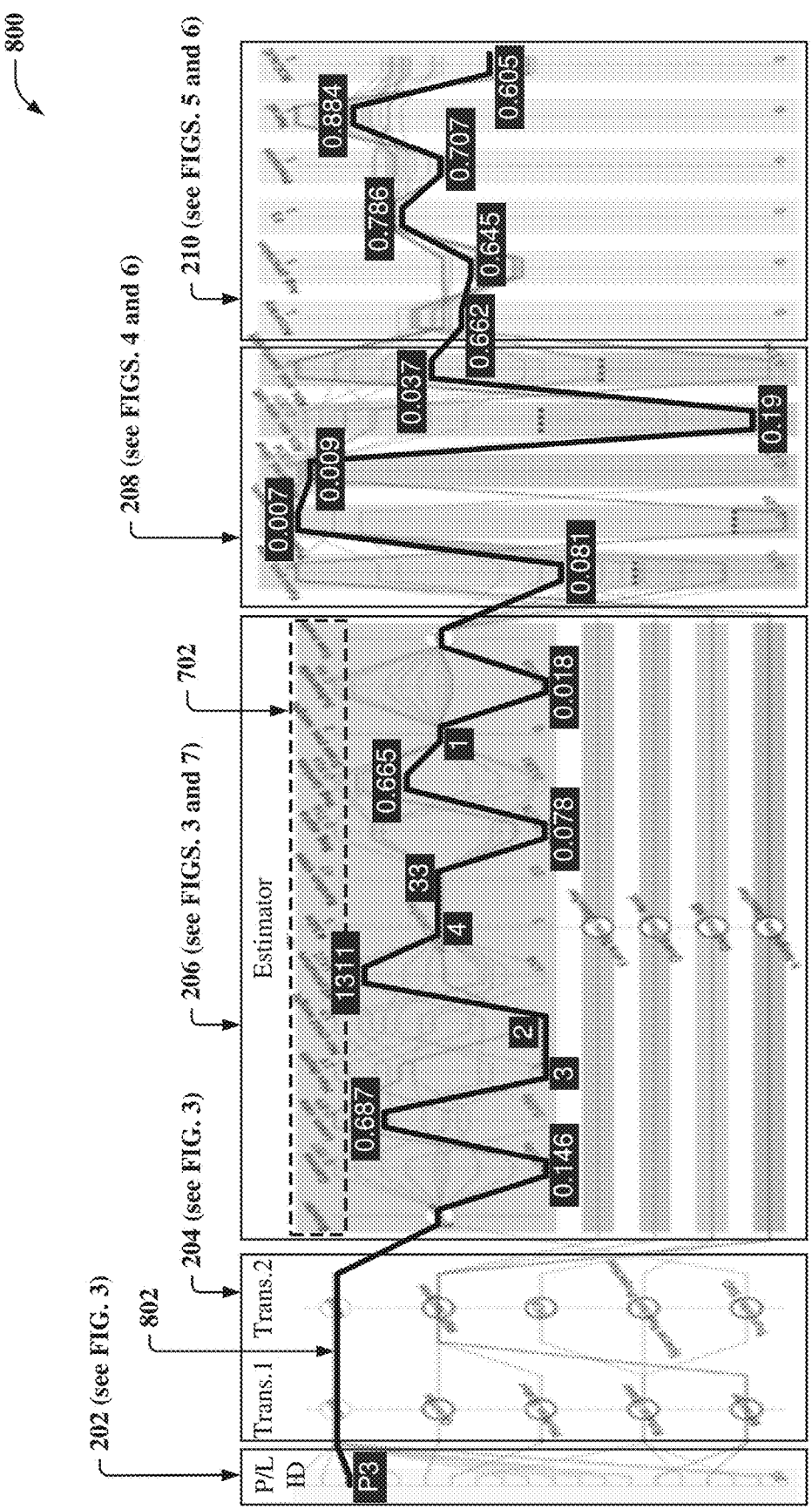
FIG. 8 illustrates a diagram of an example, non-limiting visualization that can facilitate conditional parallel coordinates in automated artificial intelligence with constraints in accordance with one or more embodiments described herein.

FIG. 8 illustrates a diagram of an example, non-limiting visualization 800 that can facilitate conditional parallel coordinates in automated artificial intelligence with constraints in accordance with one or more embodiments described herein. Repetitive description of like elements and/or processes employed in respective embodiments is omitted for sake of brevity.

Visualization 800 can comprise an example, non-limiting alternative embodiment of visualization 200 described above and illustrated in FIG. 2. As illustrated in FIG. 8, visualization 800 can comprise estimator 206a (e.g., an XGBoost Classifier) that has been expanded by an entity utilizing visualization 200 and/or 800 (e.g., model generation component 110, a human, a client, a user, a computing device, a software application, an agent, a machine learning (ML) model, an artificial intelligence (AI) model, etc.) to reveal multiple subdimensions 702 of estimator 206a. Visualization 800 can further comprise a polyline 802 that can represent a machine learning pipeline denoted as P3 in FIG. 8 that has been selected by such an entity utilizing visualization 200 and/or 800.

As described above with reference to FIG. 1 and illustrated in FIG. 8, visualization component 108 can employ such one or more rendering and/or mapping applications and/or techniques described above (e.g., a real-time rendering application) to render machine learning pipelines of a CPC visualization (e.g., visualization 200, visualization 800, etc.) as interactive polylines (e.g., polylines 302) that cross one or more axes in such a CPC visualization. In an example, polyline 802 depicted in FIG. 8 can comprise one of such interactive polylines (e.g., one of polylines 302) that has been selected by such an entity described above when utilizing visualization 200 and/or 800. In this example, based on such selection, visualization component 108 can render the selected machine learning pipeline (e.g., the selected polyline 302) as polyline 802, where polyline 802 can comprise a format that is different from that of other polylines 302 that represent other machine learning pipelines. For instance, as illustrated in FIG. 8, visualization component 108 can render polyline 802 as a polyline having a greater thickness and/or different hue compared to all other polylines 302 representing all other machine learning pipelines of visualization 800. In this example, visualization component 108 can further render the numerical scores of polyline 802 with respect to each axis of visualization 800 (e.g., constraint scores, optimization metric scores, etc.) at the locations where polyline 802 crosses each of such axes in visualization 800.

In the examples above, such an entity utilizing visualization 200 and/or 800 can select each polyline 302 individually (e.g., one at a time) and visualization component 108 can render only the selected polyline 302 as polyline 802. For instance, when such an entity utilizing visualization 200 and/or 800 selects a first polyline 302 representing a certain machine learning pipeline and then selects a second polyline 302 representing another machine learning pipeline, visualization component 108 can deselect the previously selected first polyline 302 and can further render only the second polyline 302 as polyline 802.

Figure 9A:
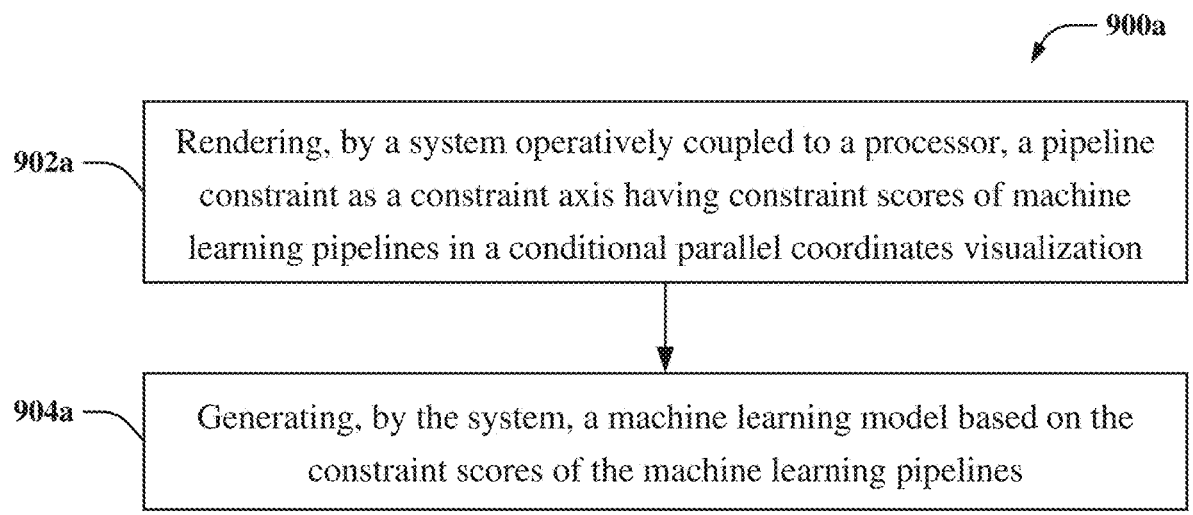
FIG. 9A illustrates a flow diagram of an example, non-limiting computer-implemented method that can facilitate conditional parallel coordinates in automated artificial intelligence with constraints in accordance with one or more embodiments described herein.

FIG. 9A illustrates a flow diagram of an example, non-limiting computer-implemented method 900a that can facilitate conditional parallel coordinates in automated artificial intelligence with constraints in accordance with one or more embodiments described herein. Repetitive description of like elements and/or processes employed in respective embodiments is omitted for sake of brevity.

At 902a, computer-implemented method 900a can comprise rendering, by a system (e.g., via machine learning model generation system 102 and/or visualization component 108) operatively coupled to a processor (e.g., processor 106), a pipeline constraint (e.g., a pipeline attribute constraint, an optimization metric, etc.) as a constraint axis (e.g., pipeline attribute constraint axes 208a, 208b, 208c, 208d, and/or 208e, optimization metric axes 210a, 210b, 210c, 210d, 210e, and/or 210f, etc.) having constraint scores (e.g., the constraint scores and/or optimization metric scores described above with reference to FIGS. 1-8) of machine learning pipelines (e.g., machine learning pipelines described above and represented as polylines 302 in FIGS. 2-8) in a conditional parallel coordinates (CPC) visualization (e.g., visualization 200, 300, 400, 500, 600, 700, and/or 800).

At 904a, computer-implemented method 900a can comprise generating, by the system (e.g., via machine learning model generation system 102 and/or model generation component 110), a machine learning model based on the constraint scores of the machine learning pipelines. For example, as described above with reference to FIG. 1, model generation component 110 can generate a machine learning model based on the constraint scores and/or the optimization metric scores of the machine learning pipelines in the CPC visualization. For instance, model generation component 110 can comprise an automated artificial intelligence (AutoAI) entity (e.g., a computing device, a software application, an agent, a machine learning (ML) model, an artificial intelligence (AI) model, etc.) that can: employ the CPC visualization described above to analyze various machine learning pipelines based on various attributes (e.g., various transformers, estimators, pipeline constraints, optimization metrics, etc.), the constraint scores, and/or the optimization metric scores of such machine learning pipelines; select a machine learning pipeline that satisfies a defined objective (e.g., the machine learning pipeline having the best constraint scores and/or optimization metric scores relative to other machine learning pipelines); and/or generate a machine learning model by implementing the steps of the selected machine learning pipeline (e.g., by implementing the transformation steps of the selected machine learning pipeline, training the estimator of the selected machine learning pipeline, and/or fine-tuning the hyperparameters of the selected machine learning pipeline).

Figure 9B:
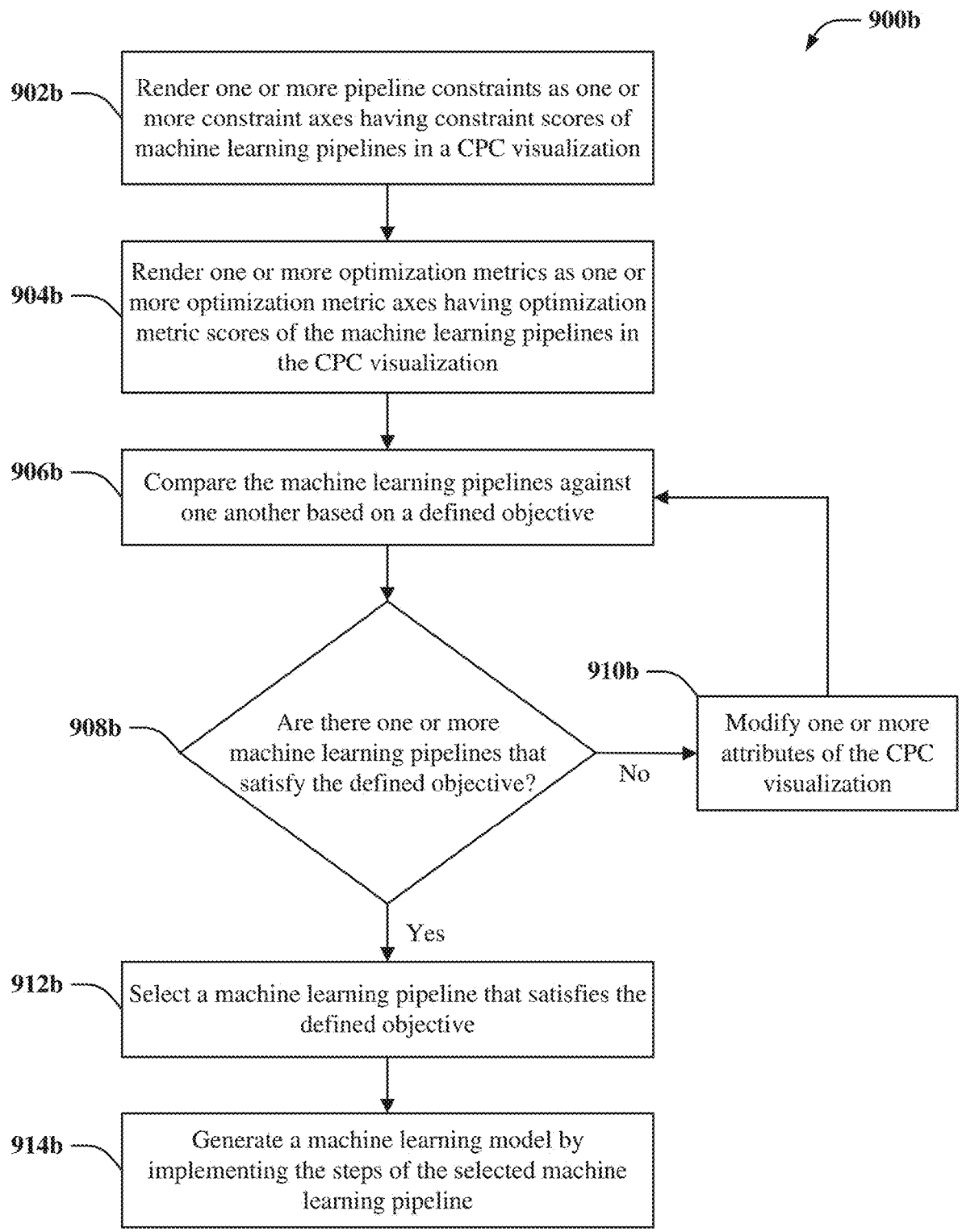
FIG. 9B illustrates a flow diagram of an example, non-limiting computer-implemented method that can facilitate conditional parallel coordinates in automated artificial intelligence with constraints in accordance with one or more embodiments described herein.

FIG. 9B illustrates a flow diagram of an example, non-limiting computer-implemented method 900b that can facilitate conditional parallel coordinates in automated artificial intelligence with constraints in accordance with one or more embodiments described herein. Repetitive description of like elements and/or processes employed in respective embodiments is omitted for sake of brevity.

At 902b, computer-implemented method 900b can comprise rendering (e.g., via machine learning model generation system 102 and/or visualization component 108) one or more pipeline constraints (e.g., the pipeline attribute constraint(s) described above with reference to FIGS. 1-8) as one or more constraint axes (e.g., pipeline attribute constraint axes 208a, 208b, 208c, 208d, and/or 208e) having constraint scores (e.g., the constraint scores described above with reference to FIGS. 1-8) of machine learning pipelines (e.g., machine learning pipelines described above and represented as polylines 302 in FIGS. 2-8) in a CPC visualization (e.g., visualization 200, 300, 400, 500, 600, 700, and/or 800).

At 904b, computer-implemented method 900b can comprise rendering (e.g., via machine learning model generation system 102 and/or visualization component 108) one or more optimization metrics (e.g., the optimization metrics described above with reference to FIGS. 1-8) as one or more optimization metric axes (e.g., optimization metric axes 210a, 210b, 210c, 210d, 210e, and/or 2101) having optimization metric scores (e.g., the optimization metric scores described above with reference to FIGS. 1-8) of the machine learning pipelines in the CPC visualization.

At 906b, computer-implemented method 900b can comprise comparing (e.g., via machine learning model generation system 102 and/or model generation component 110) the machine learning pipelines against one another based on a defined objective (e.g., identifying the machine learning pipeline having the best constraint scores and/or optimization metric scores relative to other machine learning pipelines). For example, as described above with reference to FIG. 1, model generation component 110 can comprise an automated artificial intelligence (AutoAI) entity (e.g., a computing device, a software application, an agent, a machine learning (ML) model, an artificial intelligence (AI) model, etc.) that can employ the CPC visualization described above to analyze various machine learning pipelines based on various attributes (e.g., various transformers, estimators, pipeline constraints, optimization metrics, etc.), the constraint scores, and/or the optimization metric scores of such machine learning pipelines to identify the machine learning pipeline that satisfies the defined objective.

At 908b, computer-implemented method 900b can comprise determining (e.g., via machine learning model generation system 102 and/or model generation component 110) whether there are one or more machine learning pipelines that satisfy the defined objective.

If it is determined at 908b that there are not one or more machine learning pipelines that satisfy the defined objective, at 910b, computer-implemented method 900b can comprise modifying (e.g., via machine learning model generation system 102 and/or visualization component 108) one or more attributes of the CPC visualization (e.g., one or more transformers, estimators, pipeline constraints, optimization metrics, etc.). Based on such modification of such one or more attributes of the CPC visualization at operation 910b, computer-implemented method 900b can return to operation 906b to compare the machine learning pipelines against one another based on the defined objective and the modified attribute(s) of the CPC visualization.

If it is determined at 908b that there are one or more machine learning pipelines that satisfy the defined objective, at 912b, computer-implemented method 900b can comprise selecting (e.g., via machine learning model generation system 102 and/or model generation component 110) a machine learning pipeline that satisfies the defined objective (e.g., the machine learning pipeline having the best constraint scores and/or optimization metric scores relative to other machine learning pipelines).

At 914b, computer-implemented method 900b can comprise generating (e.g., via machine learning model generation system 102 and/or model generation component 110) a machine learning model by implementing the steps of the selected machine learning pipeline (e.g., by implementing the transformation steps of the selected machine learning pipeline, training the estimator of the selected machine learning pipeline, and/or fine-tuning the hyperparameters of the selected machine learning pipeline).

Machine learning model generation system 102 can be associated with various technologies. For example, machine learning model generation system 102 can be associated with conditional parallel coordinates technologies, conditional parallel coordinates with constraints technologies, artificial intelligence technologies, machine learning technologies, automated artificial intelligence technologies, automated machine learning technologies, automated artificial intelligence visualization technologies, automated machine learning visualization technologies, cloud computing technologies, and/or other technologies.

Machine learning model generation system 102 can provide technical improvements to systems, devices, components, operational steps, and/or processing steps associated with the various technologies identified above. For example, machine learning model generation system 102 can render a pipeline constraint (e.g., a pipeline attribute constraint, an optimization metric, etc.) as a constraint axis (e.g., a pipeline attribute constraint axis, an optimization metric axis, etc.) having constraint scores of machine learning pipelines in a CPC visualization; and/or generate a machine learning model based on the constraint scores of the machine learning pipelines. In this example, an entity utilizing such a CPC visualization (e.g., model generation component 110, a human, a client, a user, a computing device, a software application, an agent, a machine learning (ML) model, an artificial intelligence (AI) model, etc.), can define one or more attributes of the CPC visualization (e.g., one or more transformers, estimators, pipeline constraints, optimization metrics, etc.) to facilitate selection of a machine learning pipeline that satisfies a defined objective using the defined attribute(s) of the CPC visualization (e.g., the machine learning pipeline having the best constraint scores and/or optimization metric scores relative to other machine learning pipelines based on such defined attribute(s) of the CPC visualization).

Machine learning model generation system 102 can provide technical improvements to a processing unit (e.g., processor 106) associated with a classical computing device and/or a quantum computing device (e.g., a quantum processor, quantum hardware, superconducting circuit, etc.) associated with machine learning model generation system 102. For example, by enabling such an entity utilizing the CPC visualization described above to define one or more attributes of the CPC visualization, machine learning model generation system 102 can reduce the amount of time spent by such an entity in analyzing and selecting a machine learning pipeline that satisfies a defined objective. In this example, by reducing the amount of time spent by such an entity in analyzing and selecting a machine learning pipeline that satisfies the defined objective, machine learning model generation system 102 can thereby facilitate at least one of improved performance, improved efficiency, and/or reduced computational costs of such an entity and/or a processing unit (e.g., processor 106) utilized by such an entity to: analyze the various machine learning pipelines; select the machine learning pipeline that satisfies the defined objective; and generate a machine learning model using the selected machine learning pipeline. For instance, by reducing the amount of time spent by such an entity in analyzing and selecting a machine learning pipeline that satisfies the defined objective, machine learning model generation system 102 can reduce the number of processing cycles executed by a processing unit (e.g., processor 106) utilized by such an entity to execute such analysis, selection, and model generation operations described above, which can facilitate at least one of improved performance, improved efficiency, and/or reduced computational costs of such a processing unit (e.g., processor 106).

Based on such improved machine learning pipeline analysis, selection, and model generation operations described above, a practical application of machine learning model generation system 102 is that it can be implemented by an automated artificial intelligence entity (e.g., an automated machine learning model generation entity) to facilitate: a) improved analysis of various machine learning pipelines based on defined attribute(s) in a CPC visualization; and/or b) improved selection of a machine learning pipeline that satisfies a defined objective.

It should be appreciated that machine learning model generation system 102 provides a new approach driven by relatively new automated artificial intelligence technologies (e.g., an automated machine learning model generation entity). For example, machine learning model generation system 102 provides a new approach to analyze various machine learning pipelines based on defined attribute(s) in a CPC visualization and/or to select a machine learning pipeline that satisfies a defined objective.

Machine learning model generation system 102 can employ hardware or software to solve problems that are highly technical in nature, that are not abstract and that cannot be performed as a set of mental acts by a human In some embodiments, one or more of the processes described herein can be performed by one or more specialized computers (e.g., a specialized processing unit, a specialized classical computer, a specialized quantum computer, etc.) to execute defined tasks related to the various technologies identified above. Machine learning model generation system 102 and/or components thereof, can be employed to solve new problems that arise through advancements in technologies mentioned above, employment of quantum computing systems, cloud computing systems, computer architecture, and/or another technology.

It is to be appreciated that machine learning model generation system 102 can utilize various combinations of electrical components, mechanical components, and circuitry that cannot be replicated in the mind of a human or performed by a human, as the various operations that can be executed by machine learning model generation system 102 and/or components thereof as described herein are operations that are greater than the capability of a human mind. For instance, the amount of data processed, the speed of processing such data, or the types of data processed by machine learning model generation system 102 over a certain period of time can be greater, faster, or different than the amount, speed, or data type that can be processed by a human mind over the same period of time.

According to several embodiments, machine learning model generation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that machine learning model generation system 102 can include information that is impossible to obtain manually by an entity, such as a human user. For example, the type, amount, and/or variety of information included in machine learning model generation system 102, visualization component 108, model generation component 110, visualization 200, visualization 300, visualization 400, visualization 500, visualization 600, visualization 700, and/or visualization 800 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
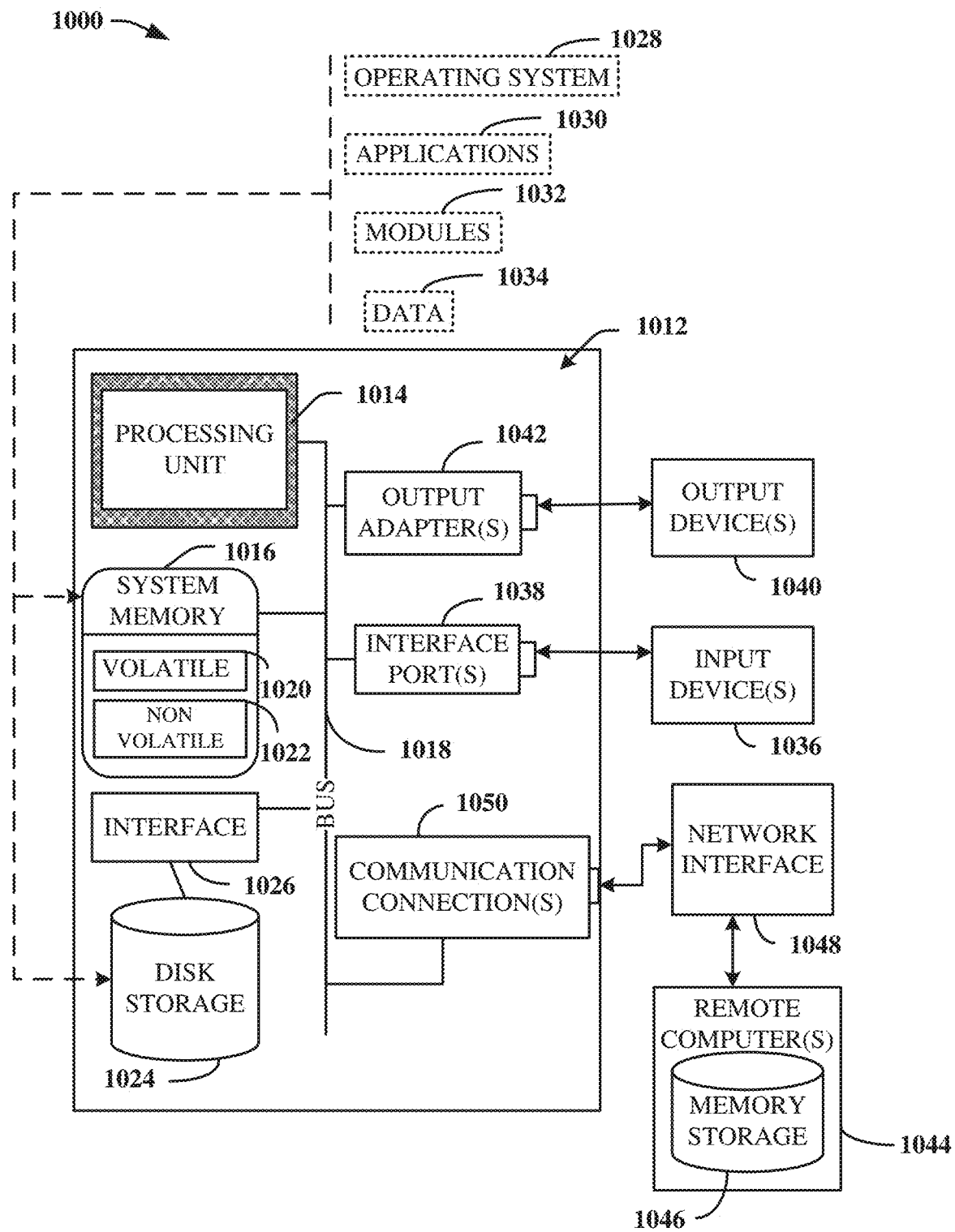
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
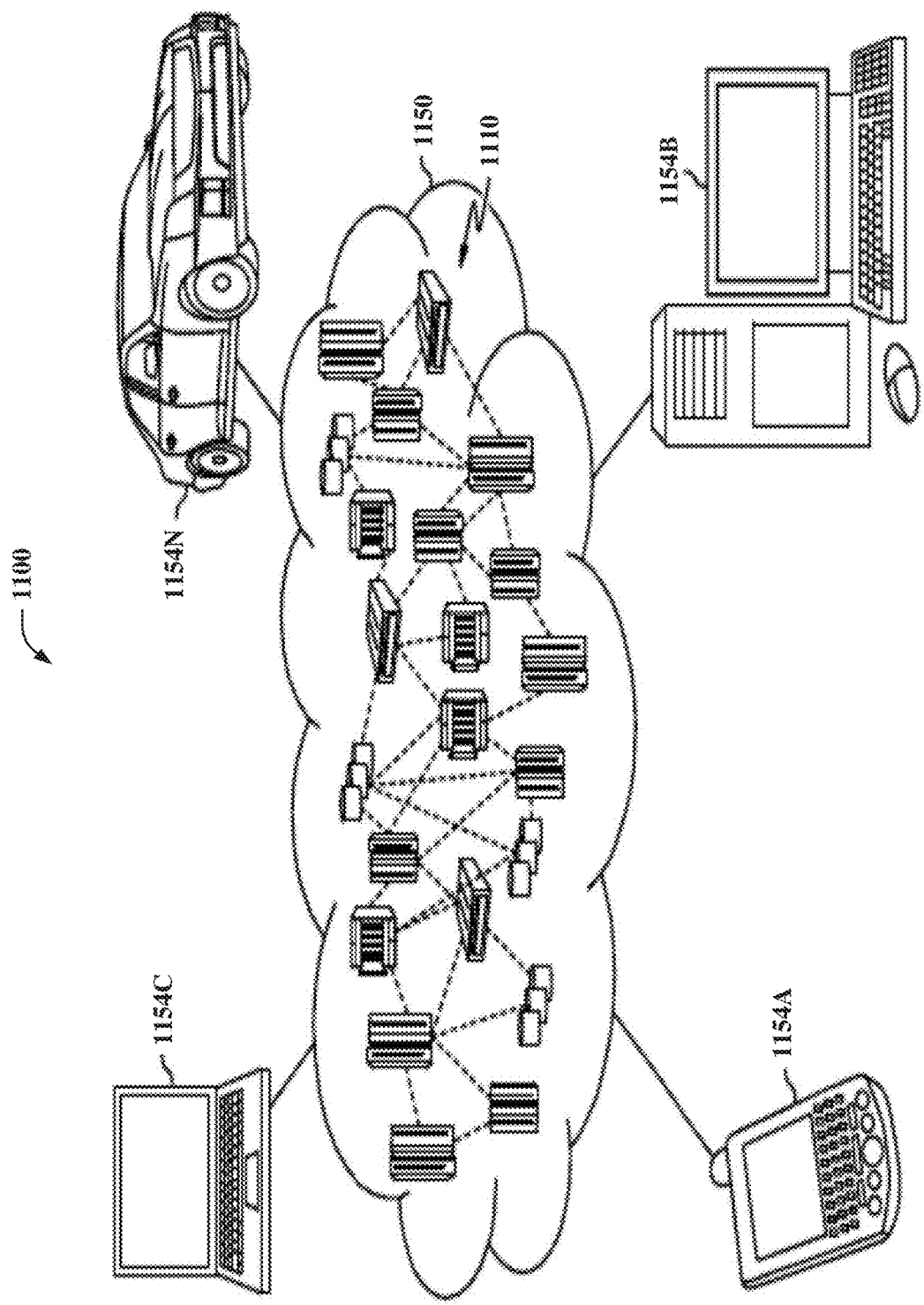
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Although not illustrated in FIG. 11, cloud computing nodes 1110 can further comprise a quantum platform (e.g., quantum computer, quantum hardware, quantum software, etc.) with which local computing devices used by cloud consumers can communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
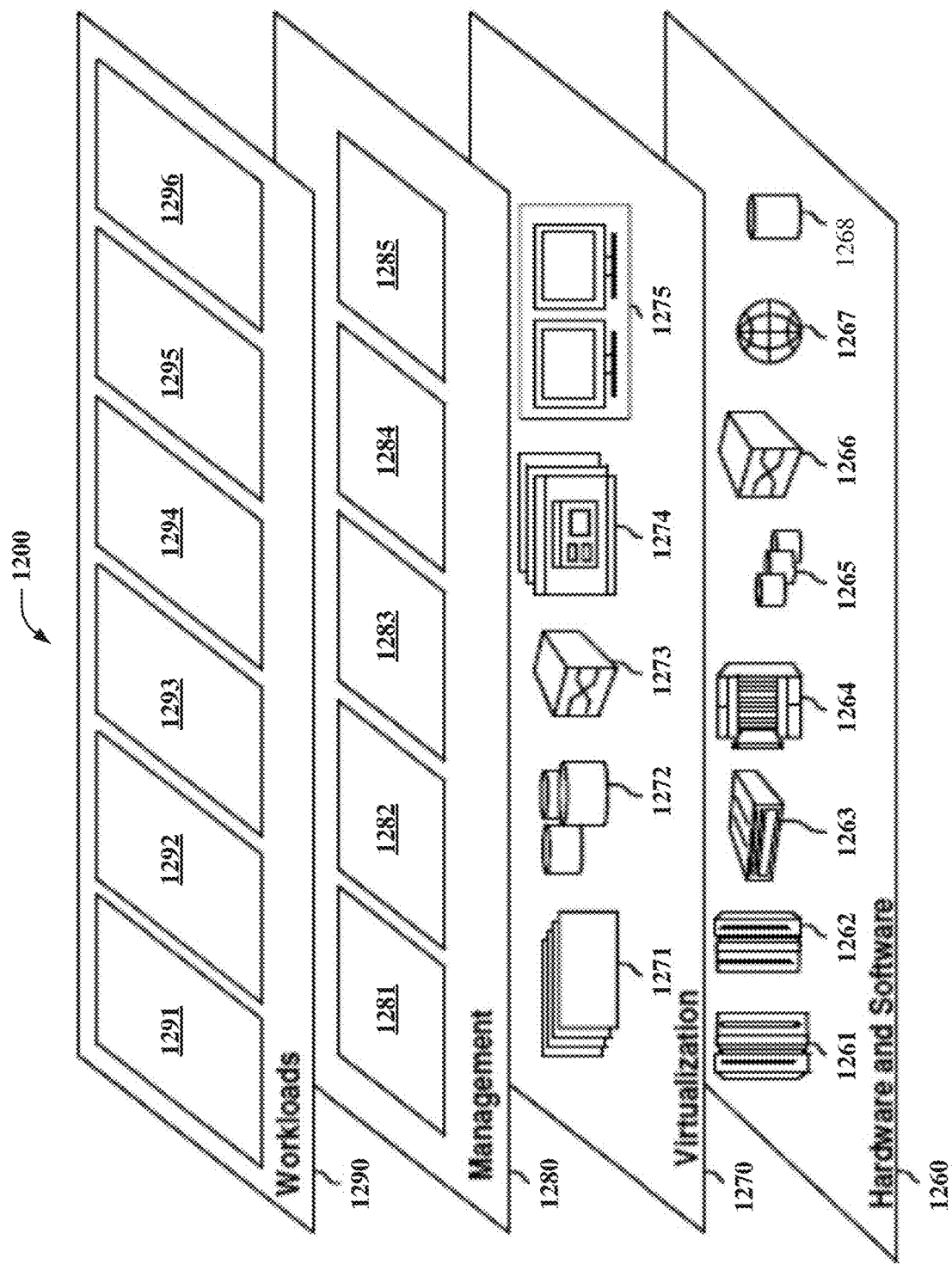
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267, database software 1268, quantum platform routing software (not illustrated in FIG. 12), and/or quantum software (not illustrated in FIG. 12).

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and machine learning model generation software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a memory that stores computer executable components; and
  a processor that executes the computer executable components stored in the memory, wherein the computer executable components comprise:
    a visualization component that renders a pipeline constraint as a constraint axis having constraint scores of machine learning pipelines in a conditional parallel coordinates visualization; and
    a model generation component that generates a machine learning model based on the constraint scores of the machine learning pipelines.

2. The system of claim 1, wherein the pipeline constraint comprises an optimization metric, and wherein the visualization component renders the optimization metric as an optimization metric axis having optimization metric scores of the machine learning pipelines in the conditional parallel coordinates visualization.

3. The system of claim 1, wherein the constraint axis comprises at least one of a visual threshold indicative of a value corresponding to the pipeline constraint or a coding system indicative of different values corresponding to the pipeline constraint, and wherein the visualization component renders the constraint scores of the machine learning pipelines as polylines crossing the constraint axis.

4. The system of claim 1, wherein the visualization component renders a pipeline identification axis comprising the machine learning pipelines rendered as polylines in the conditional parallel coordinates visualization, and wherein the polylines cross one or more axes in the conditional parallel coordinates visualization.

5. The system of claim 1, wherein the visualization component renders a consistent orientation of the constraint scores of the machine learning pipelines in the constraint axis and optimization metric scores of the machine learning pipelines in an optimization metric axis in the conditional parallel coordinates visualization.

6. The system of claim 1, wherein the conditional parallel coordinates visualization comprises an interactive conditional parallel coordinates visualization, and wherein at least one of the constraint axis or one or more second axes in the conditional parallel coordinates visualization comprise expandable dimensions having one or more subdimension axes through which the machine learning pipelines cross.

7. The system of claim 1, wherein at least one of the pipeline constraint, a value corresponding to the pipeline constraint, one or more features of the constraint axis, or one or more features of one or more second axes in the conditional parallel coordinates visualization are defined by an entity, thereby facilitating at least one of improved selection of a machine learning pipeline by the model generation component to generate the machine learning model or improved performance of the model generation component or the processor in generating the machine learning model based on the constraint scores of the machine learning pipelines.

8. A computer-implemented method, comprising:
  rendering, by a system operatively coupled to a processor, a pipeline constraint as a constraint axis having constraint scores of machine learning pipelines in a conditional parallel coordinates visualization; and
  generating, by the system, a machine learning model based on the constraint scores of the machine learning pipelines.

9. The computer-implemented method of claim 8, wherein the pipeline constraint comprises an optimization metric, and further comprising:
  rendering, by the system, the optimization metric as an optimization metric axis having optimization metric scores of the machine learning pipelines in the conditional parallel coordinates visualization.

10. The computer-implemented method of claim 8, wherein the constraint axis comprises at least one of a visual threshold indicative of a value corresponding to the pipeline constraint or a coding system indicative of different values corresponding to the pipeline constraint, and further comprising:
  rendering, by the system, the constraint scores of the machine learning pipelines as polylines crossing the constraint axis.

11. The computer-implemented method of claim 8, further comprising:
  rendering, by the system, a pipeline identification axis comprising the machine learning pipelines rendered as polylines in the conditional parallel coordinates visualization, wherein the polylines cross one or more axes in the conditional parallel coordinates visualization.

12. The computer-implemented method of claim 8, further comprising:
  rendering, by the system, a consistent orientation of the constraint scores of the machine learning pipelines in the constraint axis and optimization metric scores of the machine learning pipelines in an optimization metric axis in the conditional parallel coordinates visualization.

13. The computer-implemented method of claim 8, wherein the conditional parallel coordinates visualization comprises an interactive conditional parallel coordinates visualization, and wherein at least one of the constraint axis or one or more second axes in the conditional parallel coordinates visualization comprise expandable dimensions having one or more subdimension axes through which the machine learning pipelines cross.

14. The computer-implemented method of claim 8, further comprising:
defining, by the system, at least one of the pipeline constraint, a value corresponding to the pipeline constraint, one or more features of the constraint axis, or one or more features of one or more second axes in the conditional parallel coordinates visualization, thereby facilitating at least one of improved selection by the system of a machine learning pipeline to generate the machine learning model or improved performance of the system or the processor in generating the machine learning model based on the constraint scores of the machine learning pipelines.

15. A computer program product facilitating an automated machine learning model generation process, the computer program product comprising a computer readable storage medium having program instructions embodied therewith, the program instructions executable by a processor to cause the processor to:
render, by the processor, a pipeline constraint as a constraint axis having constraint scores of machine learning pipelines in a conditional parallel coordinates visualization; and
generate, by the processor, a machine learning model based on the constraint scores of the machine learning pipelines.

16. The computer program product of claim 15, wherein the pipeline constraint comprises an optimization metric, and wherein the program instructions are further executable by the processor to cause the processor to:
render, by the processor, the optimization metric as an optimization metric axis having optimization metric scores of the machine learning pipelines in the conditional parallel coordinates visualization.

17. The computer program product of claim 15, wherein the constraint axis comprises at least one of a visual threshold indicative of a value corresponding to the pipeline constraint or a coding system indicative of different values corresponding to the pipeline constraint, and wherein the program instructions are further executable by the processor to cause the processor to:
render, by the processor, the constraint scores of the machine learning pipelines as polylines crossing the constraint axis.

18. The computer program product of claim 15, wherein the program instructions are further executable by the processor to cause the processor to:
render, by the processor, a consistent orientation of the constraint scores of the machine learning pipelines in the constraint axis and optimization metric scores of the machine learning pipelines in an optimization metric axis in the conditional parallel coordinates visualization.

19. The computer program product of claim 15, wherein the conditional parallel coordinates visualization comprises an interactive conditional parallel coordinates visualization, and wherein at least one of the constraint axis or one or more second axes in the conditional parallel coordinates visualization comprise expandable dimensions having one or more subdimension axes through which the machine learning pipelines cross.

20. The computer program product of claim 15, wherein the program instructions are further executable by the processor to cause the processor to:
define, by the processor, at least one of the pipeline constraint, a value corresponding to the pipeline constraint, one or more features of the constraint axis, or one or more features of one or more second axes in the conditional parallel coordinates visualization.

\* \* \* \* \*